(12) United States Patent
Chughtai et al.

(10) Patent No.: US 12,035,154 B2
(45) Date of Patent: Jul. 9, 2024

(54) METHODS AND SYSTEMS OF USING A PLURALITY OF REMOTE SUBSCRIBER IDENTIFICATION MODULE PROFILES

(71) Applicant: Pismo Labs Technology Limited, Kowloon (HK)

(72) Inventors: Uzair Ahmed Chughtai, Kowloon (HK); Man Kit Kwan, New Territories (HK); Yu Yeung, Kowloon (HK); Fawad Ahmed, Karachi (PK); Tomas Šeirys, Kaunas (LT); Azim Ui Islam, Jashore (BD); Chun Kit Chan, New Territories (HK); Ka Ho Ho, Kowloon (HK)

(73) Assignee: Pismo Labs Technology Limited, Kowloon (HK)

( * ) Notice: Subject to any disclaimer, the term of this patent is extended or adjusted under 35 U.S.C. 154(b) by 374 days.

(21) Appl. No.: 17/571,448

(22) Filed: Jan. 7, 2022

(65) Prior Publication Data

US 2022/0386148 A1 Dec. 1, 2022

Related U.S. Application Data

(63) Continuation-in-part of application No. 17/625,731, filed as application No. PCT/IB2021/054675 on May 28, 2021.

(51) Int. Cl.
*H04W 24/02* (2009.01)
*H04W 76/15* (2018.01)
(52) U.S. Cl.
CPC ........... *H04W 24/02* (2013.01); *H04W 76/15* (2018.02)

(58) Field of Classification Search
CPC .............................. H04W 24/02; H04W 76/15
See application file for complete search history.

(56) References Cited

U.S. PATENT DOCUMENTS

| 2013/0252576 | A1 | 9/2013 | Syal |
| 2019/0191298 | A1 | 6/2019 | Kim |
| 2019/0222999 | A1 | 7/2019 | Cho |
| 2019/0373444 | A1 | 12/2019 | Chughtai |

(Continued)

FOREIGN PATENT DOCUMENTS

CN 111512655 A 8/2020

OTHER PUBLICATIONS

International Search Report in related International Application No. PCT/IB2021/054675, mailed on Mar. 2, 2022.

(Continued)

*Primary Examiner* — Curtis B Odom
(74) *Attorney, Agent, or Firm* — Hershkovitz & Associates, PLLC; Abe Hershkovitz

(57) ABSTRACT

The present invention discloses methods and systems for providing UICC/eUICC related response information to information requests at a cellular router. The method includes receiving an information request from a wireless communication module, and determining whether a response to the information request is cached. When the response information is not cached, forwarding the information request to a massive SIM apparatus (MSA). MSA will then respond to the information request. A response based on the MSA's response will then be sent to the wireless communication module for the information request. When the response information is cached, retrieve the response information and send it to the wireless communication module.

20 Claims, 26 Drawing Sheets

(56) References Cited

U.S. PATENT DOCUMENTS

2021/0021983 A1  1/2021  Chughtai
2021/0219125 A1  7/2021  Chughtai

OTHER PUBLICATIONS

Written Opinion of the International Search Authority in related International Application No. PCT/IB2021/054675, mailed on Mar. 2, 2022.
English Language Abstract of CN 111512655 A (Aug. 7, 2020).

METHODS AND SYSTEMS OF USING A PLURALITY OF REMOTE SUBSCRIBER IDENTIFICATION MODULE PROFILES

RELATED APPLICATIONS

This patent application is a non-provisional continuation in-part application, which claims the benefits of and is based on U.S. patent application Ser. No. 17/625,731 filed on Jan. 7, 2022, which is a 371 National Stage entry of Patent Cooperation Treaty Application No. PCT/162021/054675, filed on May 28, 2021, and is related to U.S. patent application Ser. No. 17/571,445 and U.S. patent application Ser. No. 17/571,447, both filed on Jan. 7, 2022, the disclosures of which are hereby incorporated by specific reference thereto.

TECHNICAL FIELD

The present invention generally relates to the field of cellular communication, and more particularly, to methods and systems for using universal integrated circuit card (UICC) or embedded universal integrated circuit card (eUICC) housed in a remote apparatus to establish wireless carrier network connections at a cellular router through a plurality of wireless communication modules (WCMs).

BACKGROUND ART

A SIM profile is commonly stored in a Universal Integrated Circuit Cards (UICC) or Embedded Universal Integrated Circuit Cards (eUICC), and the UICC or eUICC is usually placed very closely with a cellular modem, such as within three centimeters. When a cellular router accesses a SIM profile from a SIM located remotely through the Internet, latency and packet loss significantly impact the reliability of the access. Non-accessible SIM profile may result in breaking of cellular router's connectivity. This is not desirable.

Further, when there are hundreds and thousands of SIM profiles that need to be maintained and managed, this could consume a large amount of time and resources of administrators. This is also not desirable.

SUMMARY OF INVENTION

One exemplary embodiment of the present invention discloses a method and system for providing response information to information requests at a cellular router. The method includes receiving an information request from a wireless communication module. After that, determining whether a first response information corresponding to the information request is stored in a storage unit. When the first response information corresponding to the information request is not stored in the storage unit, forwarding the information request to a massive SIM apparatus, and sending a first WCM response to the WCM after receiving a second response information. When the first response information corresponding to the information request is stored in the storage unit, retrieving the first response information from the storage unit; wherein the first response information corresponds to the information request, and sending a second WCM response to the WCM. The second WCM response is generated based on the first response information.

In another exemplary embodiment of the present invention, a method, and a corresponding system, is disclosed for controlling a first input-output (IO) pin by a processing unit. The processing unit may receive a first message originated from a first WCM, it may select a first SIM interface based on the first message, configure the first IO pin to output for sending a second message to the first SIM, and send the second message to the first SIM through the first SIM interface. After that, the processing unit further configures the first IO pin to input for receiving a third message from the first SIM, receives the third message from the first SIM through the first SIM interface, and sends a fourth message.

In another exemplary embodiment of the present invention, a method, and a corresponding system, is disclosed for generating an alert. The method includes identifying a SIM profile, determining status of the SIM profile, and comparing the status to a predefined value. When the status is not the same as the predefined value, generating the alert and storing the alert.

In another exemplary embodiment of the present invention, a method, and a corresponding system, is disclosed for establishing data communication at a cellular router. The cellular router may receive an input from a user, request for at least one embedded subscriber identification module (eSIM) profile to at least one wireless carrier network using the input. After that, the cellular router may receive instructions to download at least one eSIM profile from at least one wireless carrier network, and forward the instructions to download at least one eSIM profile to a MSA. On the MSA side, it may download and install at least one eSIM profile according to the instructions received, and send a request to the MSA for at least one eSIM profile of the at least one wireless carrier network. The cellular router may receive all or part of information of at least one eSIM profile from the available at least one eSIM profile from the MSA, request data communication access using the received information to at least one wireless carrier network of the at least one eSIM profile of which information is received, and obtain data communication access to the at least one wireless carrier network of the at least one eSIM profile of which information is received.

In another exemplary embodiment of the present invention, a method, and a corresponding system, is disclosed for maintaining data communication. The MSA first receives a first subscriber identification module (SIM) profile information request from a cellular router, then selects a first SIM from a plurality of SIMs based on at least one condition, and finally sends SIM profile information of the first SIM to the cellular router. On the cellular router side, a first wireless carrier connection is established through a WCM using the SIM profile information of the first SIM. The cellular router establishes a first data connection with a host over the first wireless carrier connection, and monitoring performance of the first data connection against an expected performance threshold. When the performance of the first data connection is equal to the expected performance threshold, awaiting a predetermined time and monitoring performance of the first data connection again. When the performance of the first data connection is not equal to the expected performance threshold, send a second SIM profile information request to the MSA. When the MSA receives the second SIM profile information request from the cellular router, select a second SIM from the plurality of SIMs based on the at least one condition, and send SIM profile information of the second SIM to the cellular router. After that, the cellular router may establish a second wireless carrier connection using the SIM profile information of the second SIM, establish a second data connection with the host over the second wireless carrier connection, and disconnect the first data connection.

DESCRIPTION OF EMBODIMENTS

Figure 1A:
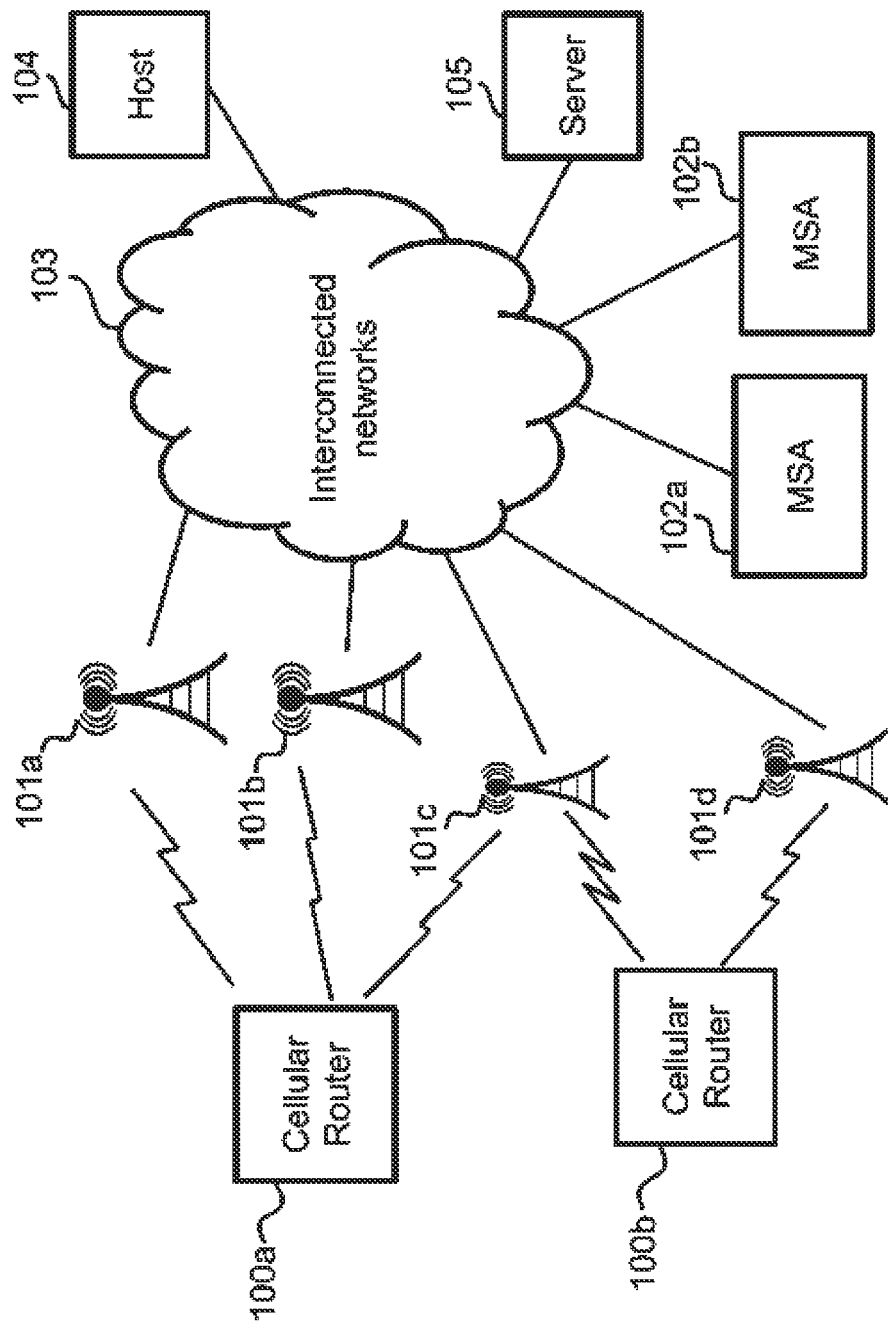
FIG. 1A is a network diagram according to the embodiments of the present invention.

The ensuing description provides preferred exemplary embodiment only and is not intended to limit the scope, applicability, or configuration of the disclosure. Rather, the ensuing description of the preferred exemplary embodiment will provide those skilled in the art with an enabling description for implementing a preferred exemplary embodiment of the disclosure. It is understood that various changes may be made in the function and arrangement of elements without departing from the spirit and scope of the disclosure as set forth in the appended claims.

Specific details are given in the following description to provide a thorough understanding of the embodiments. However, it will be understood by one ordinary skilled in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process that is illustrated as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine and a subprogram. When a process corresponds to a function, its termination corresponds to a return of the function to the calling function or the main function.

Although the methods and apparatuses have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

Embodiments, or portions thereof, may be embodied in program instructions operable upon a processing unit for performing functions and operations as described herein. The program instructions making up the various embodiments may be stored in a non-transitory computer-readable medium. Moreover, as disclosed herein, the term "non-transitory computer-readable medium" may represent one or more devices for storing data, including read-only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine-readable mediums for storing information. The term "machine-readable medium" includes, but is not limited to, portable or fixed storage devices, optical storage mediums, magnetic mediums, memory chips or cartridges, wireless channels, and various other mediums capable of storing, containing, or carrying instructions and/or data. A machine-readable medium can be realized by virtualization and can be a virtual machine-readable medium, including a virtual machine-readable medium in a cloud-based instance.

The term "non-transitory computer-readable medium" as used herein, refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to non-volatile media, volatile media, and transmission media. Non-volatile media includes, for example, optical or magnetic disks. Volatile media includes dynamic memory. Transmission media includes coaxial cables, copper wire, and fiber optics. Transmission media can also take the form of acoustic or light waves, such as those generated during radio-wave and infrared data communications.

A volatile storage may be used for storing temporary variables or other intermediate information during the execution of instructions by the processor/processing unit. A non-volatile storage or static storage may be used for storing static information and instructions for processors, as well as various system configuration parameters.

The storage medium may include a number of software modules that may be implemented as software code to be executed by the processing unit using any suitable computer instruction type. The software code may be stored as a series of instructions or commands, or as a program in the non-transitory computer-readable medium.

Various forms of computer-readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs one or more sequences of one or more instructions.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware, or microcode, the program instructions to perform the necessary tasks may be stored in a non-transitory computer-readable storage medium.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters and data, may be passed, forwarded, or transmitted via any suitable means, including memory sharing, message passing, token passing and network transmission.

Alternatively, hardwired circuitry may be used in place of, or in combination with, software instructions to implement processes consistent with the principles of the disclosure. Thus, implementations consistent with the principles of the disclosure are not limited to any specific combination of hardware circuitry and software.

A network interface may be implemented by a standalone electronic component or may be integrated with other electronic components. A network interface may have no network connection or at least one network connection depending on the configuration. A network interface may be an Ethernet interface, a wireless communication interface, a frame relay interface, a fiber optic interface, a cable interface, a Digital Subscriber Line (DSL) interface, a token ring interface, a serial bus interface, a universal serial bus (USB) interface, Firewire interface andPeripheral Component Interconnect (PCI) interface.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. A wireless access network may be implemented using infrared, High-Speed Packet Access (HSPA), HSPA+, Long Term Evolution (LTE), WiMAX, GPRS, EDGE, GSM, CDMA, Wi-Fi, CDMA2000, WCDMA, TD-SCDMA, BLUETOOTH, WiBro, Evolution-Data Optimized (EV-DO); Digital Enhanced Cordless Telecommunications (DECT); Digital AMPS (IS-136/TDMA); Integrated Digital Enhanced (iDEN) or any other wireless technologies.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, an optical signal, radio frequency or other wireless communication signals. The code segments may, in certain embodiments, be downloaded via computer networks such as the Internet, an intranet, local area network (LAN), metropolitan area network (MAN), wide area network (WAN), the Public Switched Telephone Network (PSTN), a satellite communication system, a cable transmission system, and/or the like.

A system bus may carry signals between a master component (e.g., a processing unit) and peripheral components, or among the peripheral components. A system bus may include a plurality of signal lines connecting the components inside or outside of a device. A system bus disclosed herein may be realized using any of several types of bus structures, including a memory bus, a peripheral bus, or a local bus using any of a variety of bus architecture.

A wireless carrier network, for the purposes of this specification, is a service provider of a wireless carrier network that owns or controls, or both, the wireless carrier network and all necessary elements including backhaul infrastructure, billing, customer care, provisioning computer systems to provide wireless voice and data communication services for its subscribed mobile users. A wireless carrier network is also known as a Mobile network operator (MNO), wireless service provider, wireless carrier, cellular company, wireless carrier network service provider, or mobile network carrier.

A wireless carrier network may be implemented using multiple radio access networks connected to a core network. Each regional portion of the wireless carrier network may include a number of base stations, also referred to as network cells. The wireless carrier network may provide telecommunication services in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), and 5th Generation (5G).

The wireless carrier network may be connected with one or more backend servers or entities that provide backend services. The backend services may include a core network, one or more base stations, one or more regional area networks, business support systems (BSS) and/or embedded subscriber identification module (eSIM) subscription management server (e.g., SM-DP+). In some exemplary embodiments, the eSIM subscription management server may also be referred to as a profile provisioning server. For example, the services provided by the BSS may include product management, order management, revenue management, and customer management. The services provided by SM-DP+ may include the creation of eSIM profiles in response to valid eSIM profile requests and providing eSIM profiles securely to user devices for loading onto the eUICCs.

p An eSIM profile contains all the necessary information for dialing into a wireless carrier network to enable a corresponding device to obtain telecommunication services from the MNO of the wireless carrier network. For example, each eSIM profile may contain information, such as a unique International Mobile Subscriber Identity (IMSI) number that authenticates a subscriber to a wireless carrier network, an Integrated Circuit Card Identifier (ICCID), a Mobile Station International Subscriber Directory Number (MSISDN), wireless carrier network-specific data, and security authentication information. An eSIM profile may be used to perform the same functions as a removable SIM or SIM. An eSIM profile may also be referred to as an electronic SIM.

FIG. 1A illustrates an exemplary network environment in which one or more aspects of the disclosure may be implemented. Cellular routers 100a-100b may connect to interconnected networks 103 through at least one of base stations 101a-101d respectively using wireless communication technologies, particularly cellular communication technology. Host 104 and server 105 may also connect to interconnected networks 103. Therefore, for example, cellular router 100b may be able to communicate with server 105 through base station 101d and interconnected networks 103. Massive SIM apparatus (MSAs) 102a and 102b are also connected to interconnected networks 103 respectively. MSAs 102a and 102b are capable of providing SIM profiles to any of the cellular routers 100a-100b and allowing each of the cellular routers 100a-100b to communicate with Universal Integrated Circuit Cards (UICCs) or Embedded Universal Integrated Circuit Cards (eUICCs). Cellular routers 100a-100b may connect to one or more MSAs 102a and 102b through interconnected networks 103. There is no limitation that cellular routers 100a-100b must connect to interconnected networks 103 through wireless communication technology. For example cellular router 102a may connect to MSA 102a through a wired connection, not illustrated, and through interconnected networks 103.

There is no limitation to the number of MSAs, number of hosts, number of servers, number of cellular routers, number of base stations and number of interconnected networks in a network environment, for example, there could be three interconnected networks, one is a private 5G networks, another is an intranet, and the last one is the interconnected networks. There is also no limitation to the numbers of UICCs and eUICCs that MSA 102a or 102b may have. For example, MSA 102a may have 300 UICCs and 150 eUICCs, and MSA 102b may have 500 UICCs and 20 eUICCs. There is also no limitation to the number of profiles a UICC or eUICC may hold.

For example, for illustration purposes only, there could be X number of MSAs 102a and 102b. Each of the MSAs 102a and 102b may hold Y number of UICC and eUICC, though there is no limitation that each of the MSAs 102a and 102b must hold the same number UICC and eUICC. Each UICC and eUICC may hold Z number of SIM profiles, though there is no limitation that each UICC and eUICC must have the same number of profiles. Therefore, there could be X times Y times Z number of SIM profiles in a network environment.

In one variant, a MSA management server may also be connected to one or more MSA directly or through interconnected networks. Cellular routers 100a-100b may also communicate with the MSA management server through the interconnected networks. Cellular routers 100a-100b may communicate with the MSA management server in order to find the addresses and/or hostnames of the MSAs.

Figure 1B:
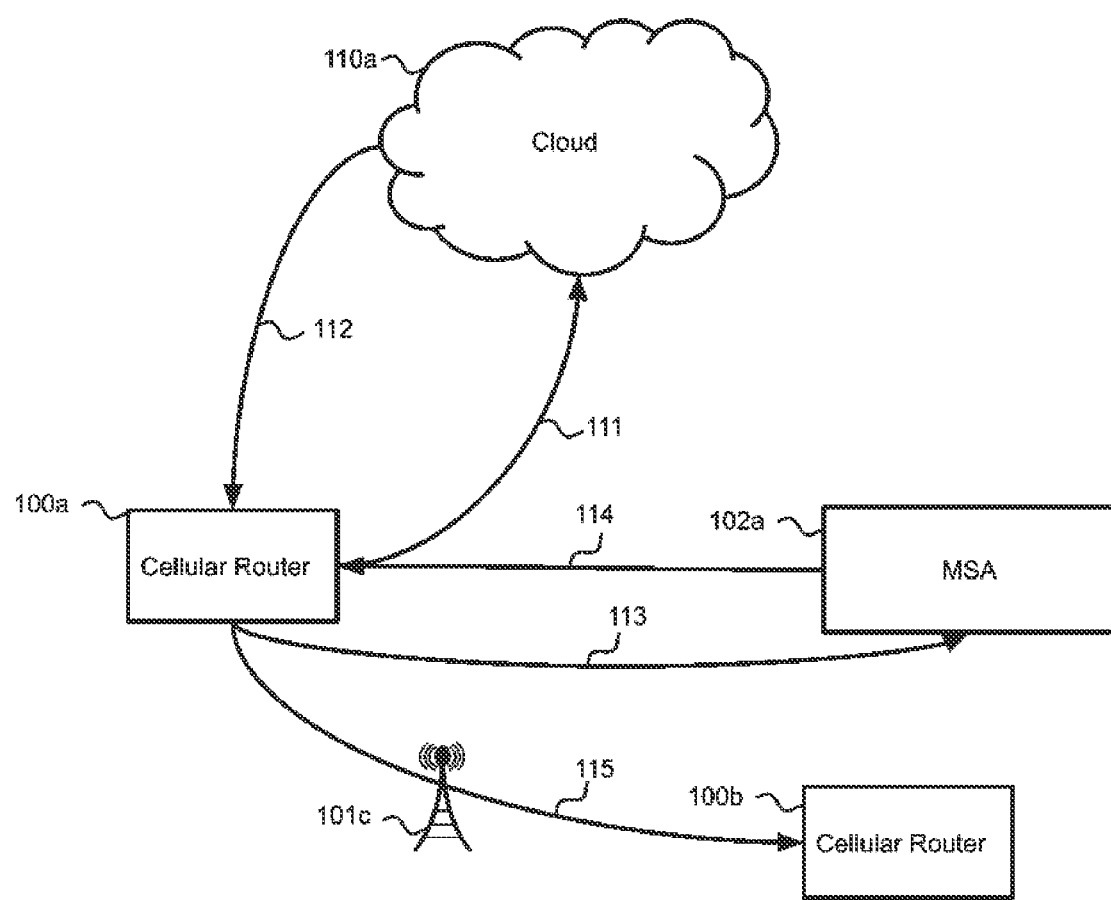
FIG. 1B is another network diagram according to the embodiments of the present invention.

FIG. 1B illustrates an exemplary network environment in which one or more aspects of the disclosure may be implemented. Cloud 110a is a platform for managing a plurality of devices, including cellular router 100a.

Figure 5A:
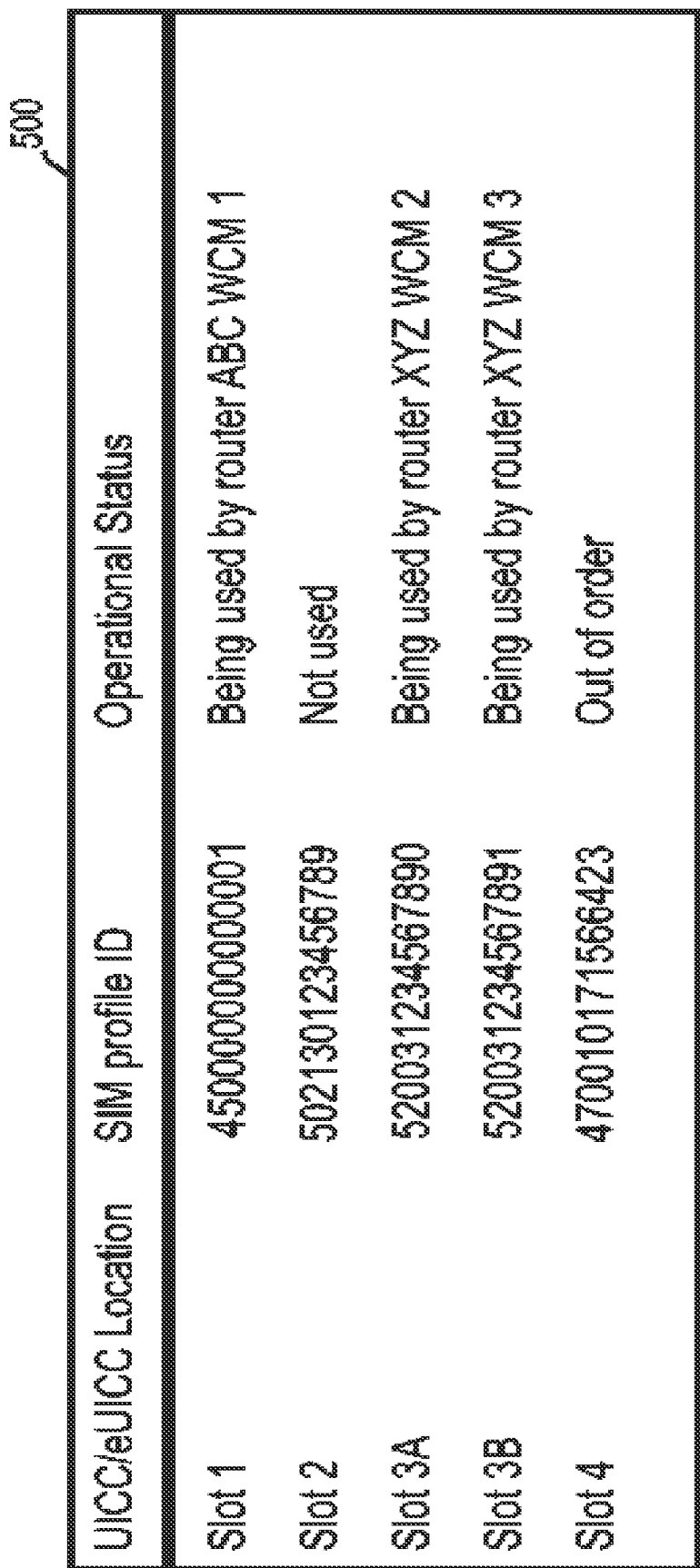
FIG. 5A illustrates the user interface displayed in the cloud platform for managing the SIM according to the embodiments of the present invention.
Figure 5B:
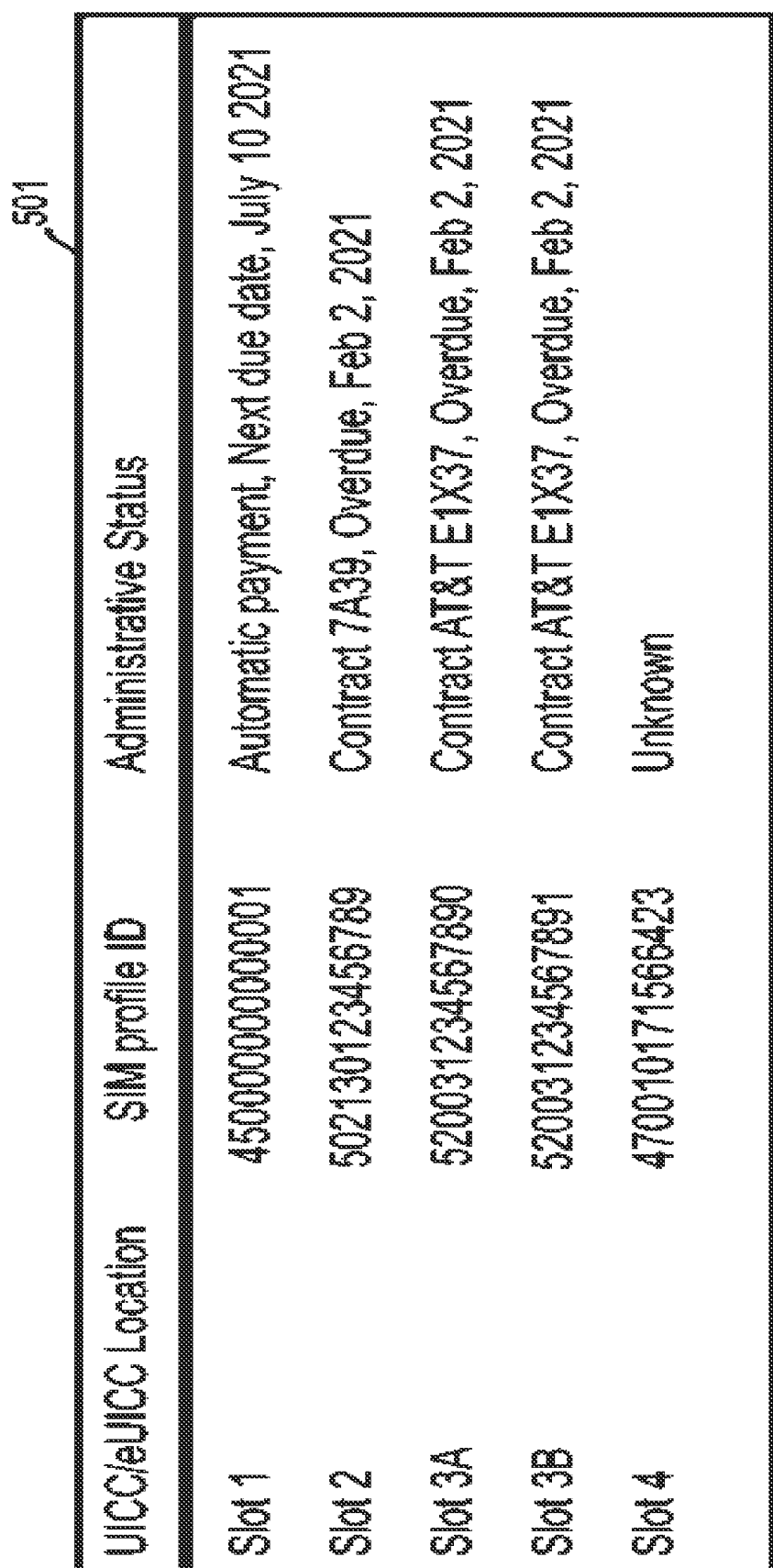
FIG. 5B illustrates another user interface displayed in the cloud platform for managing the SIM according to the embodiments of the present invention.

In general, cellular router 100a may send a request to cloud 110a (111) and receive the data related to the information request for eSIM profile (112). Cellular router 100a may send the information request to MSA 102a (113) and receive the response information from MSA 102a (114). By using the eSIM profile, cellular router 100a may establish a connection with cellular router 100b through base station 101c (115). The downloaded eSIM profile from the MSA has the same wireless carrier network with base station 101c. The user interface of Cloud 110a provided to users or administrators for managing a plurality of devices are illustrated in FIG. 5A and FIG. 5B.

In one embodiment, cloud 110a may be controlled by third parties other than the wireless carrier network provider.

In another embodiment, cloud 110a may be controlled by the wireless carrier network provider.

In one variant, cellular router 100a and cellular router 100b may be placed in two different regions. For example, cellular router 100a is located in Taiwan while cellular router 100b is located in the United States. Therefore, the SIM used for establishing a connection is a roaming SIM.

Figure 2A:
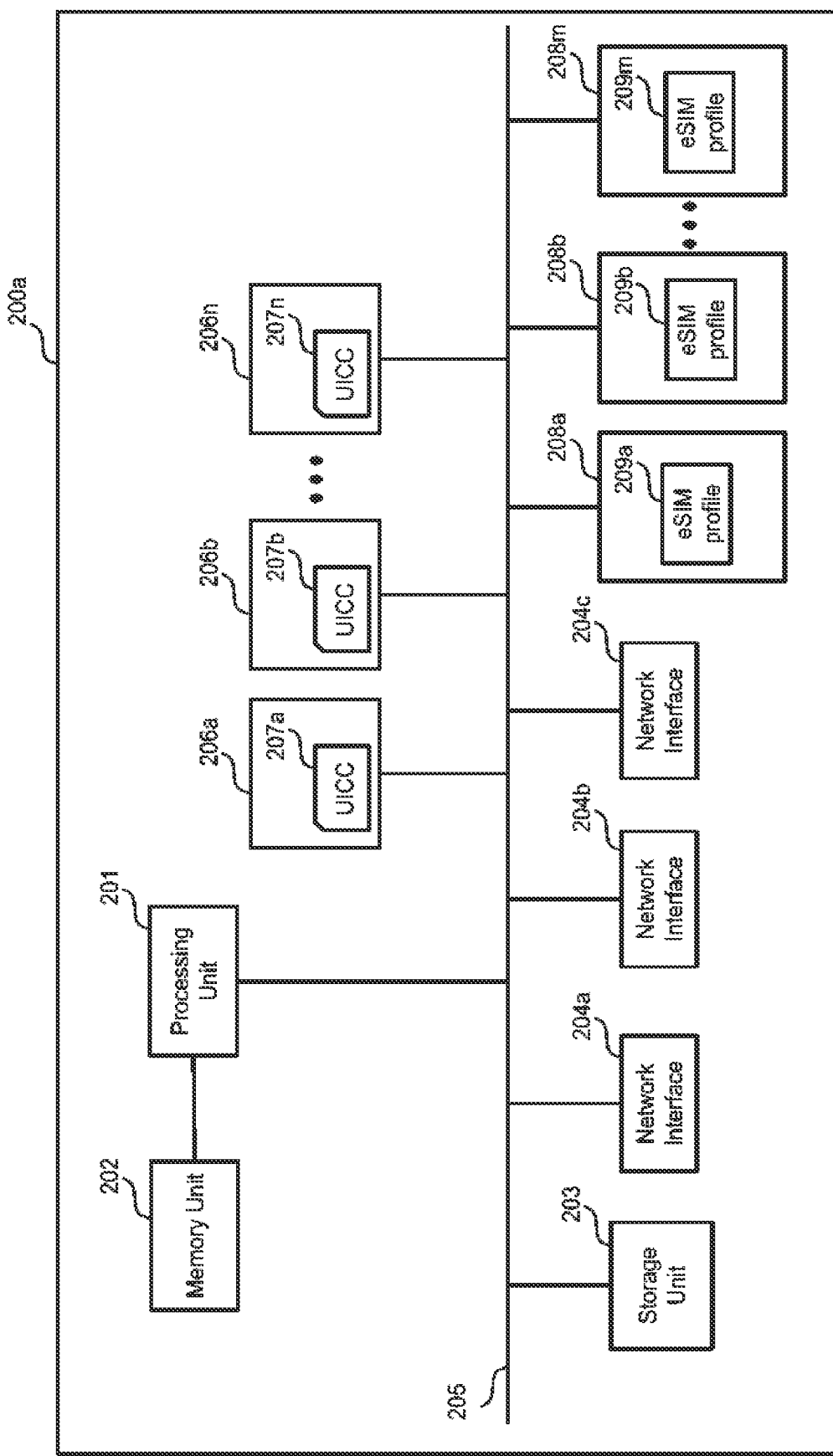
FIG. 2A is a block diagram illustrating a Massive SIM apparatus (MSA) according to the embodiments of the present invention.

FIG. 2A is a schematic block diagram illustrating the hardware blocks of a massive SIM apparatus (MSA) 200a. MSA 200a comprises processing unit 201, memory unit 202, storage unit 203, a plurality of network interfaces 204a-c, a plurality of SIM interfaces 206a-n and a plurality of Embedded Universal Integrated Circuit Cards (eUICCs) 208a-m. Each of the plurality of SIM interfaces 206a-n is capable of connecting to a removable SIM. For illustration purposes, SIM interface 206a-h connects to UICC 207a and SIM interface 206b connects to UICC 207b.

A removable SIM may be a Universal Integrated Circuit Card. There is no limitation to the number of SIM interfaces in MSA 200a. For example, the number of SIM interfaces 206 could be six-hundred, and therefore, n is six-hundred. In another example, the number of SIM interfaces 206 could be two hundred and fifty, and therefore, n is two hundred and fifty.

eUICCs 208a-m may be built into the MSA and are not removable. Each of the eUICCs 208 is configurable to contain one or more electronic SIM (eSIM) profiles. For example, eUICC 208a is used to contain eSIM profile 209a, and eUICC 208b is used to contain eSIM profile 209b. The eSIM profile may be derived from a remote eSIM subscription management server based on the information provided by a wireless carrier network. An eSIM profile contains information that provides access to a specific wireless carrier network for wireless communication. eSIM profiles 209a-m may be from the same or different wireless carrier networks. There is no limitation on the number of eUICCs that may be placed in MSA 200a. For example, the number of eUICC 208 could be five-hundred, and therefore, m is five-hundred. In another example, the number of eUICCs 206 could be fifty, and therefore, m is fifty.

A processing unit, such as processing unit 201, executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a non-transitory computer-readable storage medium.

Processing unit 201 may be a complex programmable logic device (CPLD), a field-programmable gate array (FPGA), a central processing unit (CPU), a microprocessor, a microcontroller, a digital signal processor (DSP), any combination of those devices, or any other circuitry configurable to execute the program instructions for implementing the embodiments disclosed herein. Processing unit 201 may be connected to memory unit 202 directly and to other peripheral components, such as SIM interfaces 206a-n, eUICCs 208a-m, network interfaces 204a-c and storage unit 203 through system bus 205.

For illustration purposes, three network interfaces 204a-c are connected to processing unit 201. There is no limitation that the number of network interfaces must be three. For example, the number of network interfaces may be two, or ten.

In one variant, when processing unit 201 has enough input/output pins, SIM interfaces 206 and eUICCs 208 may be directly connected to processing unit 201 without passing through system bus 205.

Figure 2B:
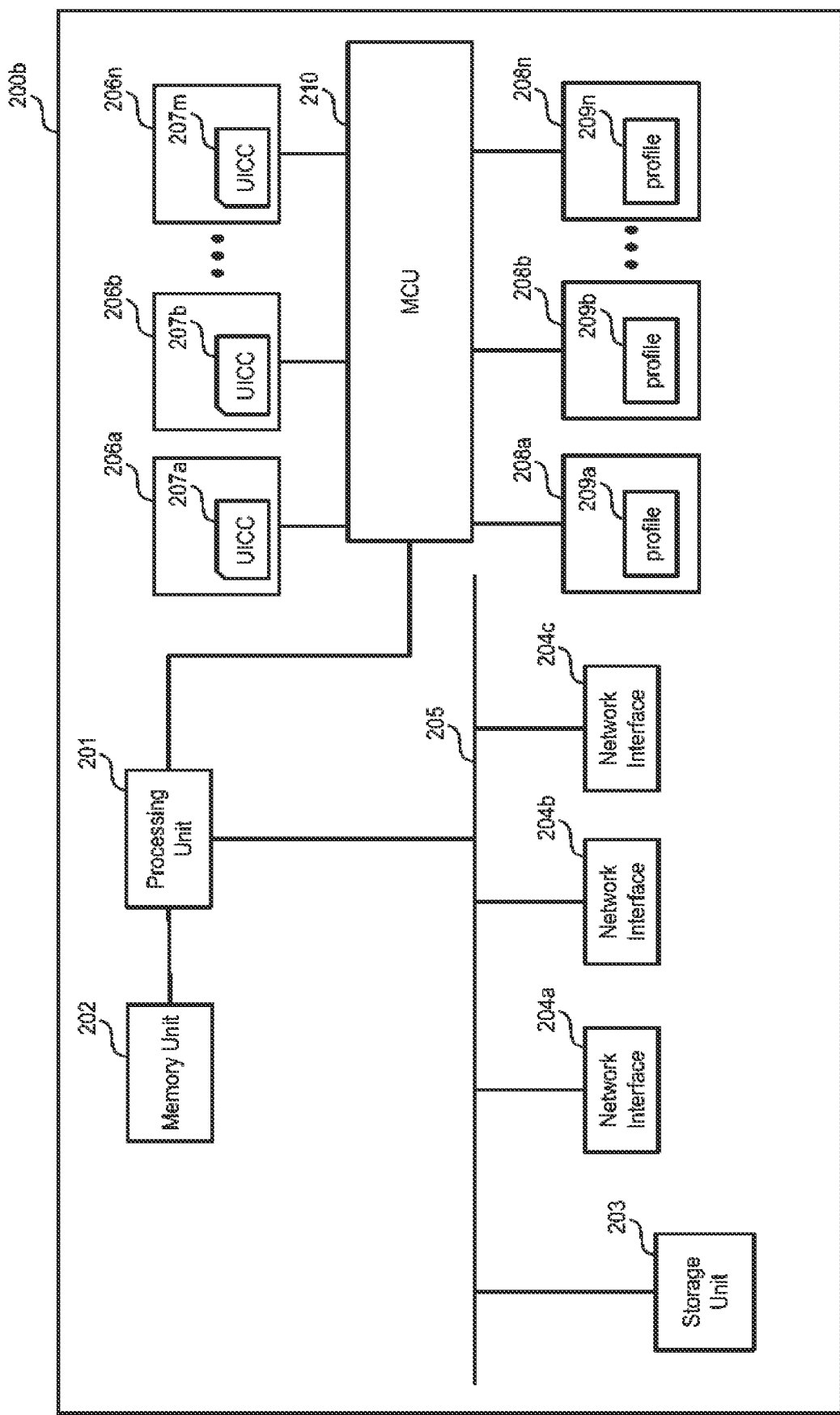
FIG. 2B is another block diagram illustrating an MSA according to the embodiments of the present invention.

In another exemplary embodiment, as shown in FIG. 2B, processing unit 201 does not have an adequate number of input/output pins to connect to all hardware components in cellular router 200b. Therefore, an MCU may also be instructed to select a UICC or eUICC from a plurality of UICCs or eUICCs. MCU 210 is connected to processing unit 201 in order to provide an adequate number of input/output pins. Some of the hardware components such as eUICCs 208a-n and SIM interfaces 206a-n may be connected to processing unit 201 through MCU 210 while the other hardware components, such as memory unit 202 and system bus 205 may be connected to the processing unit directly, through another circuit, and/or through another selector. The selector is coupled to or connected to processing unit 201 through I/O pins. Any logic circuit configurable to realize multiplexing may be used as a selector. For example, an FPGA or a multiplexer may also be used. In one example, MCU 210 may be replaced by a CPLD. In another example, MCU 210 may be replaced by a multiplexer.

Figure 2C:
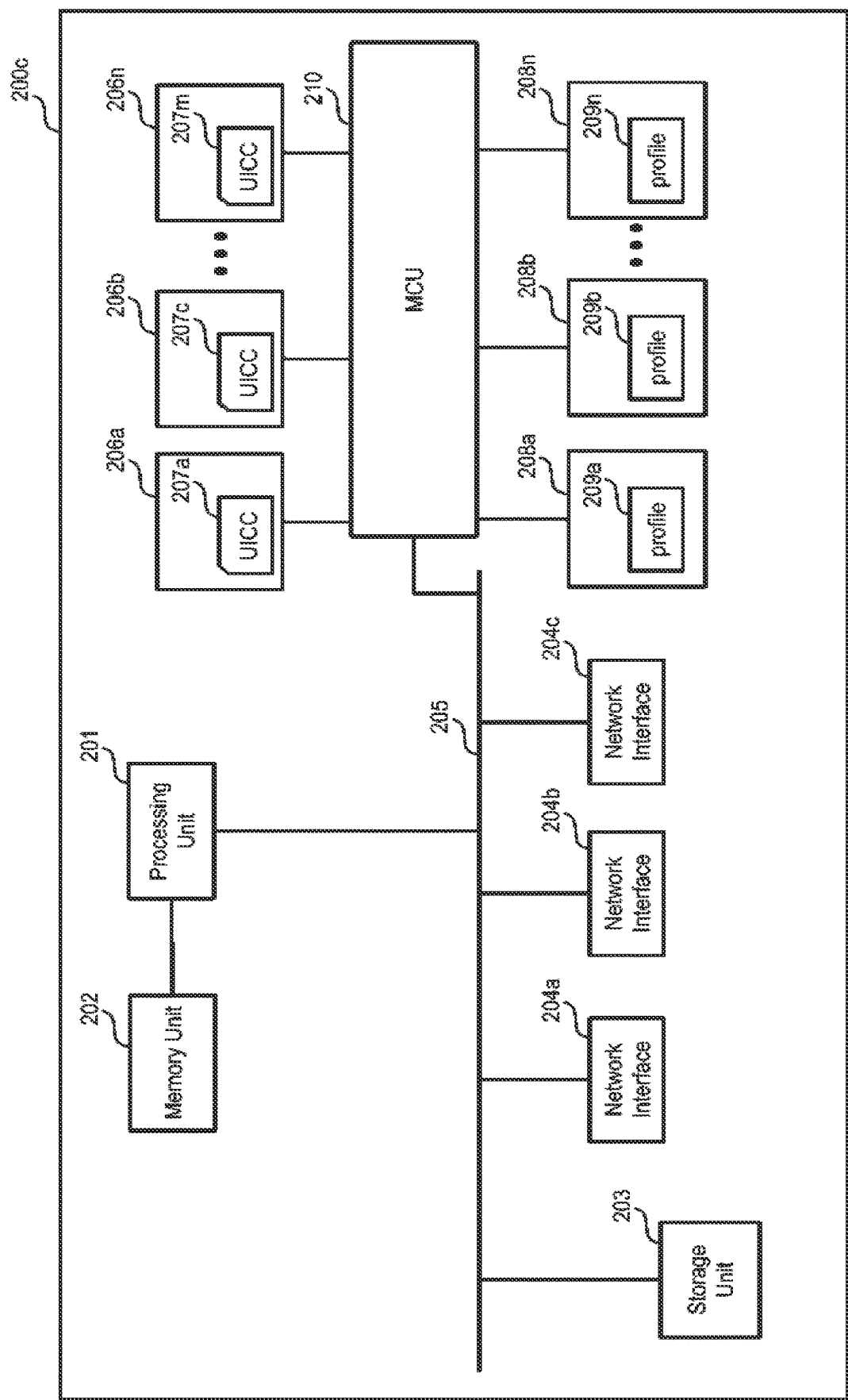
FIG. 2C is another block diagram illustrating an MSA according to the embodiments of the present invention.

In one variant, instead of connected to processing unit 201 as illustrated in FIG. 2B, MCU 210 may be connected to system bus 205 in cellular router 200c as illustrated in FIG. 2C.

FIG. 2C illustrates another MSA according to the embodiment of the present invention. MSA 200c illustrated in FIG. 2C is the same as MSA 200b illustrated in FIG. 2B except the connection between processing unit 201 and MCU 210. The connection between processing unit 201 and MCU 210 is established through the system bus.

Figure 3A:
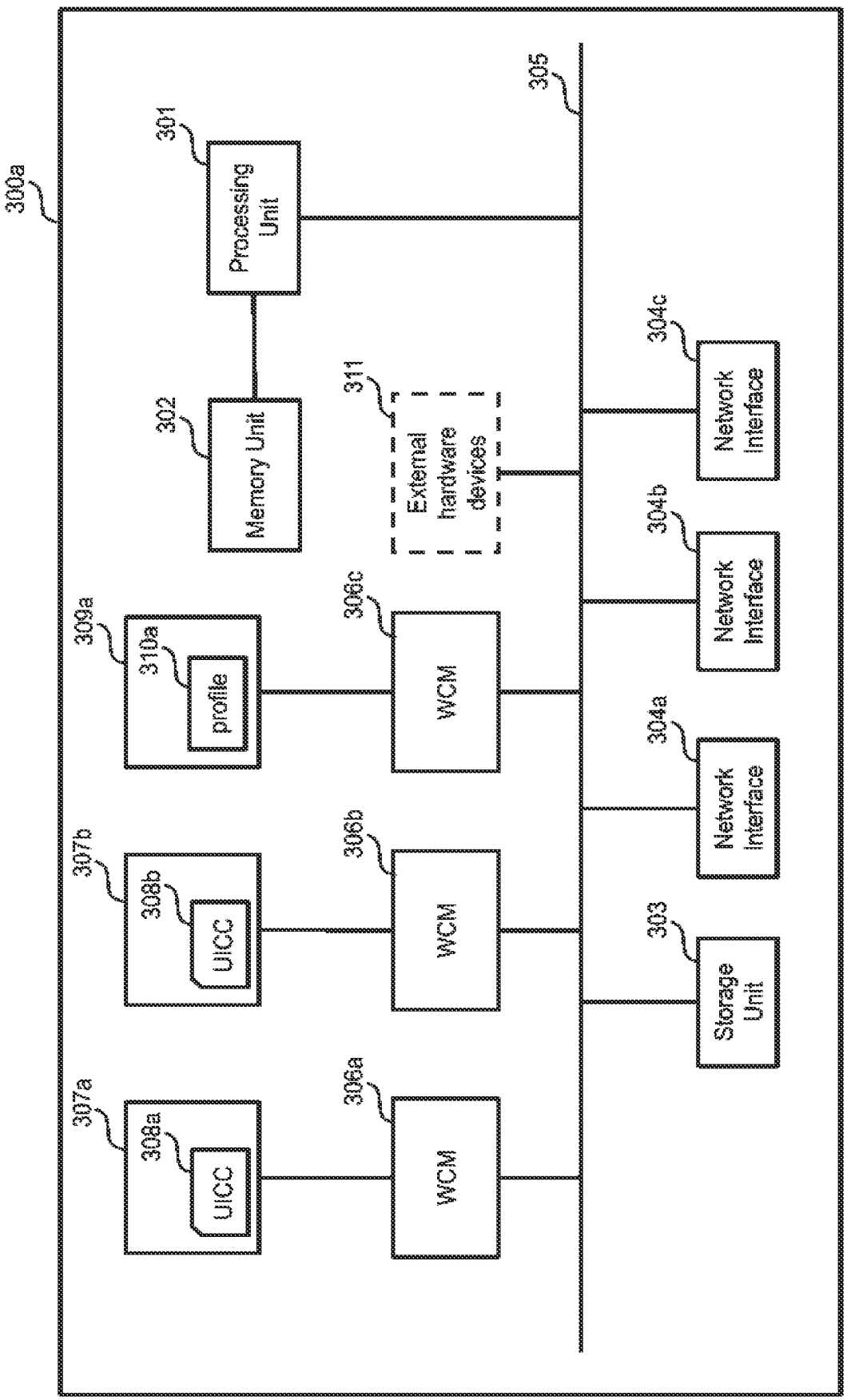
FIG. 3A is a block diagram illustrating a cellular router according to the embodiments of the present invention.

FIG. 3A is a schematic block diagram illustrating the hardware blocks of an exemplary cellular router 300a. Cellular router 300a comprises processing unit 301, memory unit 302, storage unit 303, a plurality of network interfaces 304a-c, and a plurality of wireless communication modules (WCMs) 306a-c. Each of the plurality of WCMs is connected to a SIM interface or an eUICC. For example, WCM 306a is connected to SIM interface 307a; WCM 306b is connected to SIM interface 307b; and WCM 306c is connected to eUICC 309a. An eUICC is configurable to contain one or more eSIM profiles. For example, eUICC 309a is used to contain eSIM profile 310a. The eSIM profile may be derived from an MSA based on the information provided by a wireless carrier network. Each of the plurality of SIM interfaces is capable of housing and connecting to a removable SIM. For illustration purposes, SIM interface 307a connects to UICC 308a and SIM interface 307b connects to UICC 308b.

There is no limitation on the number of WCMs. Three WCMs 306a-c illustrated in FIG. 3A are only for illustrative purposes.

There is no limitation on the number of network interfaces. Three network interfaces 304a-c illustrated in FIG. 3A are only for illustrative purposes. Network interfaces 304a-c may include local area network (LAN) interfaces and/or wide area network (WAN) interfaces.

Optionally, cellular router 300a may comprise one or more external hardware devices. For example, external hardware devices 311 may be an input unit or output unit connected to processing unit 301 through system bus 305. For example, external hardware devices 311 may be a camera module, a display module, a touch-sensitive screen, one or more sensors, such as a heat sensor, a location sensor, a touch sensor and/or a motion sensor.

In one variant, one WCMs may be connected to more than one eUICCs or SIM interface. For example, one of the WCMs may connect to two eUICCs and a SIM interface.

Figure 3B:
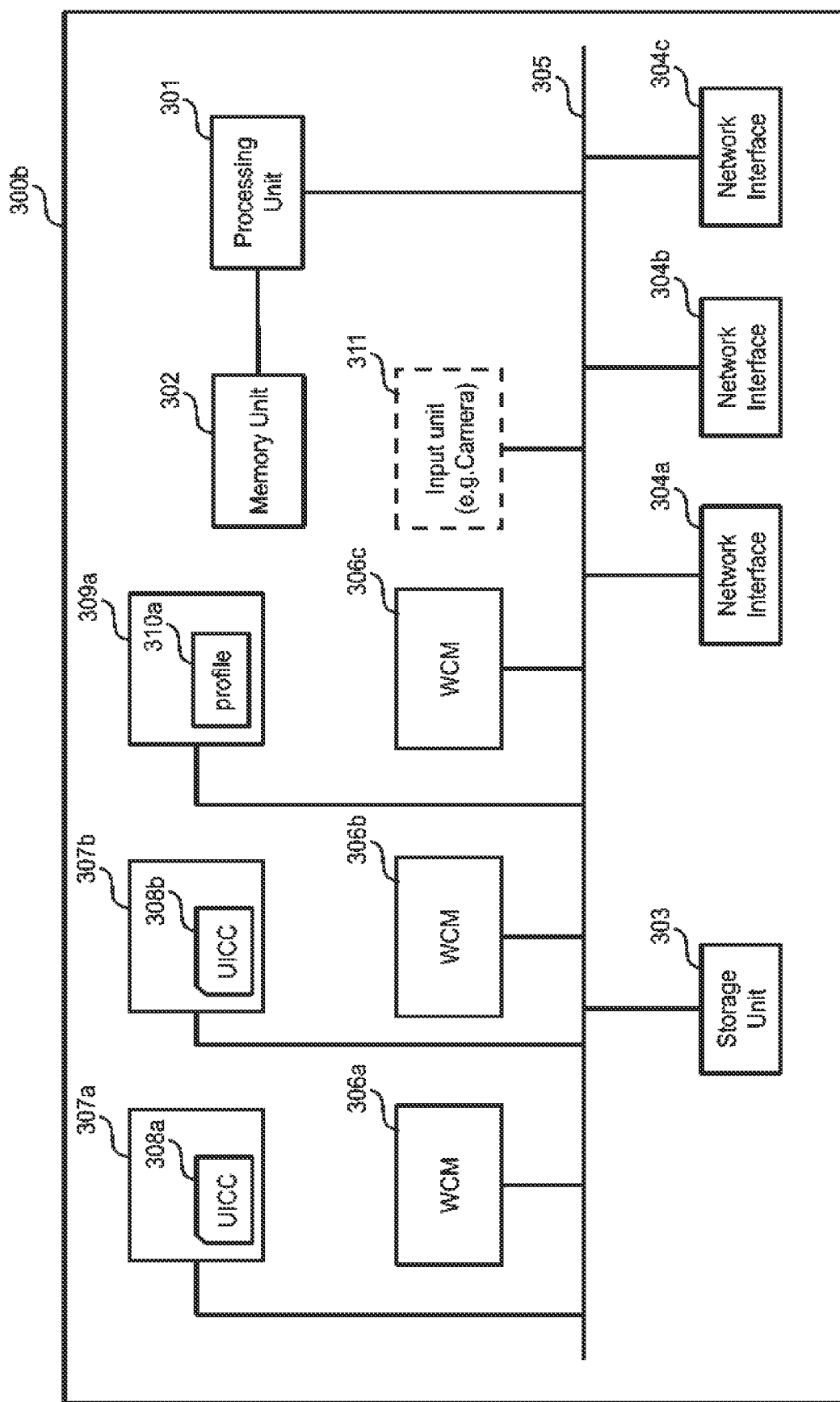
FIG. 3B is a block diagram illustrating another cellular router according to the embodiments of the present invention.

FIG. 3B is a schematic block diagram illustrating the hardware blocks of an exemplary cellular router 300b. The components shown in cellular router 300b in FIG. 3B are the same as shown in cellular router 300a in FIG. 3A. The only difference is the connection of the plurality of UICCs. Compared with FIG. 3A, each of the plurality of WCMs is connected to system bus 305, rather than connected to a SIM interface.

Figure 3C:
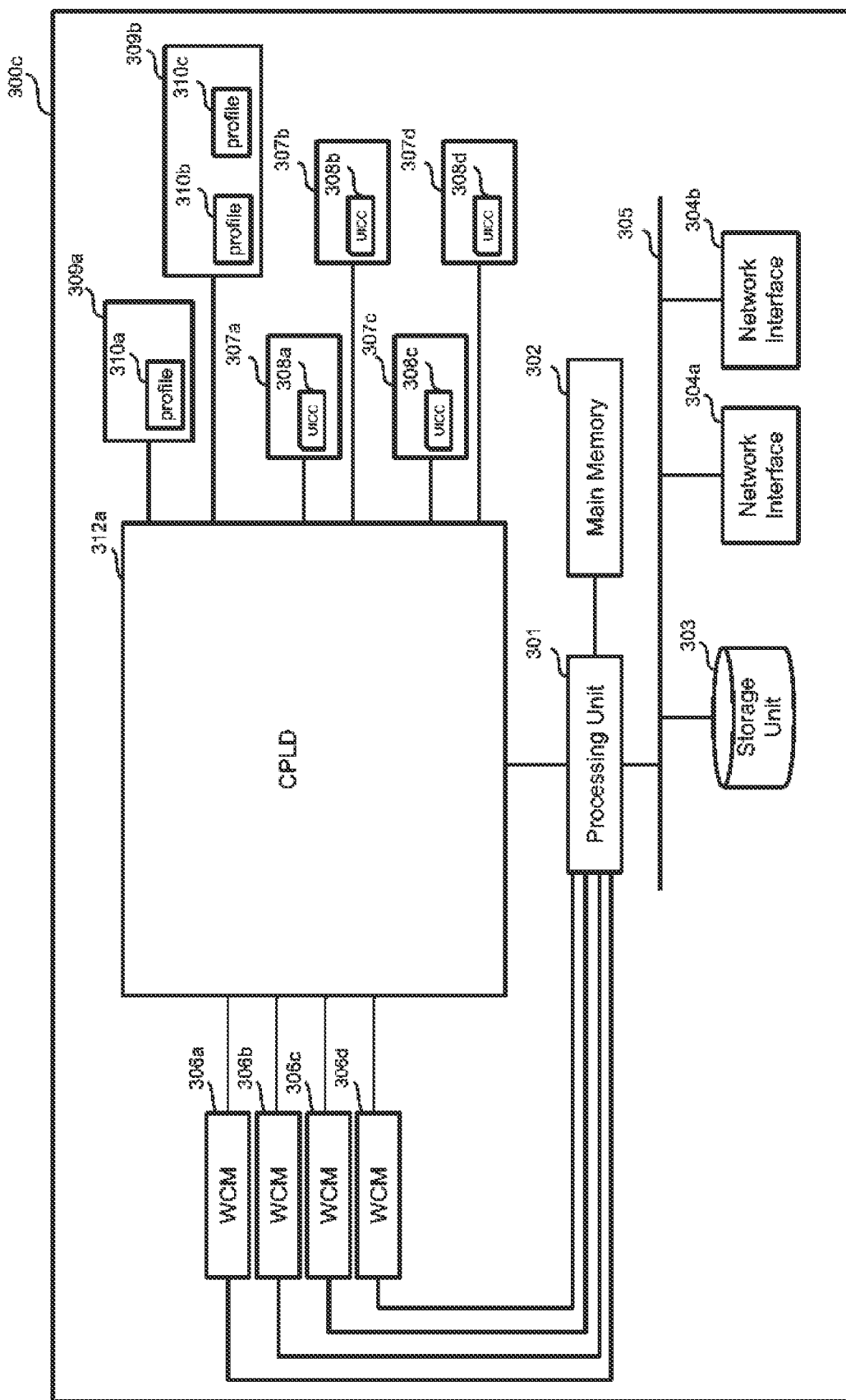
FIG. 3C is a block diagram illustrating another cellular router according to the embodiments of the present invention.

FIG. 3C is a schematic block diagram illustrating the hardware blocks of an exemplary cellular router 300c. In FIG. 3C, SIM selector is provided compared with FIG. 3A and FIG. 3B. CPLD 312a is connected to SIM interfaces 307a-307d, and eUICCs 309a-309b. Each of the plurality of SIM interfaces 307a-307d are connected to UICCs 308a-308d respectively. eUICC 309a comprises SIM profile 310a, while eUICC 309b comprises SIM profiles 310b-310c. Cellular router 300c comprises processing unit 301, memory unit 302, storage unit 303, a plurality of network interfaces 304a-b, and a plurality of WCMs 306a-d. The I/O pins of each of the plurality of WCMs are connected to processing unit 301, and then the I/O pins of processing unit 301 further connect to CPLD 312a, and further connects to the connection pins of one of the plurality of the SIM interfaces, such as SIM interface 307b, or one of the plurality of eUICCs, such as eUICC 309a. The other connections of each of the plurality of WCMs are connected to one of the SIM interfaces or one of the plurality of eUICCs through a selector, such as CPLD 312*a*. For example, WCM 306*a* is connected to eUICC 300*a* through CPLD 312*a*, and connected to SIM interface 307*a* at the same time. The connections will be discussed in more detail in FIG. 4A-4C.

Figure 3D:
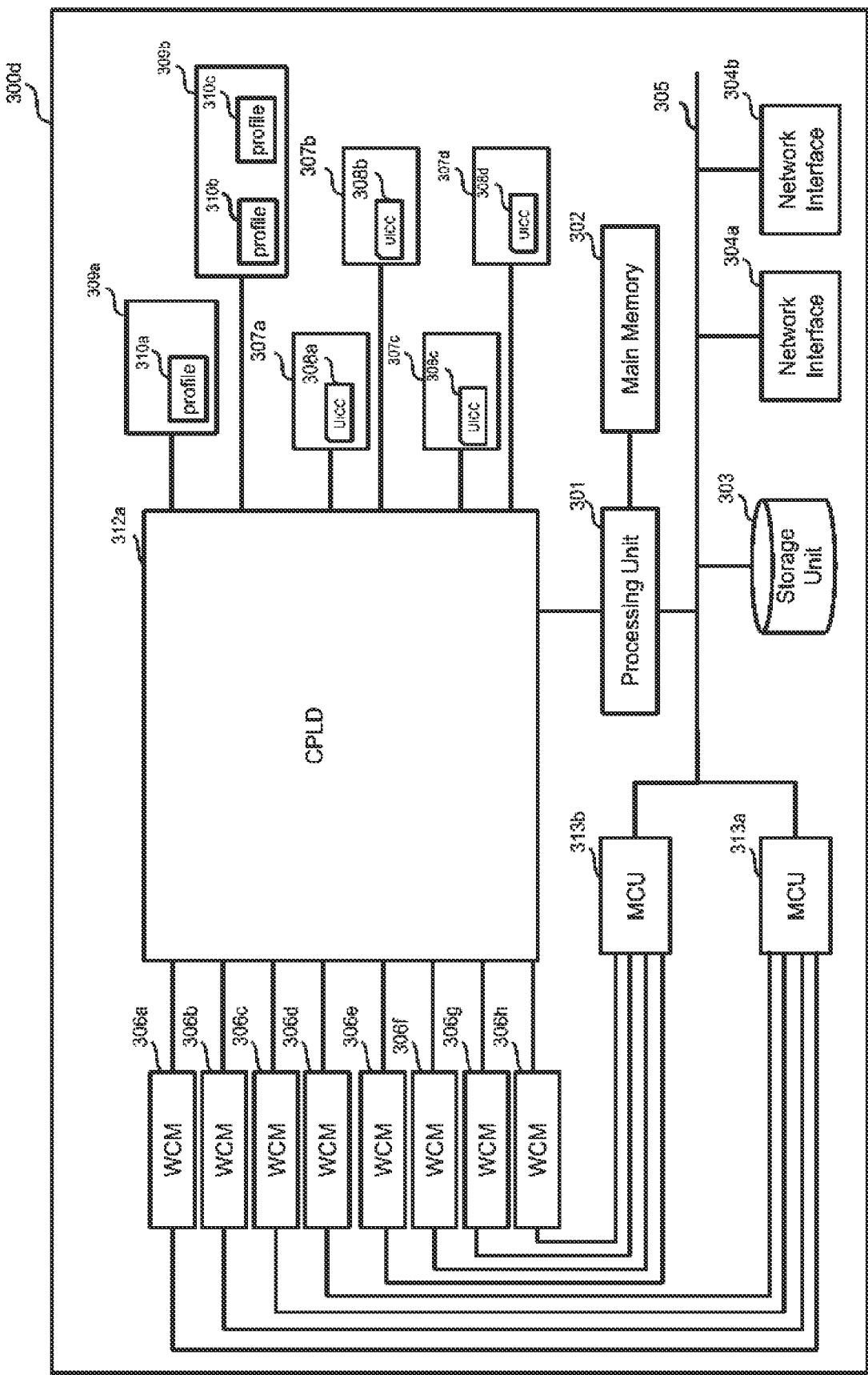
FIG. 3D is a block diagram illustrating another cellular router according to the embodiments of the present invention.

FIG. 3D is a schematic block diagram illustrating the hardware blocks of an exemplary cellular router 300*d*. Compared with FIG. 3C, cellular router 300*d* further comprises WCMs 300*e*-300*h* and MCUs 313*a*-313*b*. Since the number of pins of processing unit 301 is limited. If more WCMs are required in a cellular router, two or more MCUs are required for controlling more WCMs. For example, eight WCMs 306*a*-306*h* are required in cellular router 300*d*. Therefore, at least two MCUs will be required for connecting the eight WCMs when an MCU is capable of connecting with four WCMs. For illustration, the two MCU connected with WCMs 306*a*-*h* are MCU 313*a* and 313*b*. As illustrated, the first set of connection pins of MCU 313*a* are connected to WCM 306*a*-306*d*, while the first set of connection pins of MCU 313*b* are connected to WCM 306*e*-306*h*. On the other hand, the second set of connection pins of MCU 313*a* and the second set of connection pins of MCU 313*b* are connected to the first set of connection pins of processing unit 301*e*.

Figure 4A:
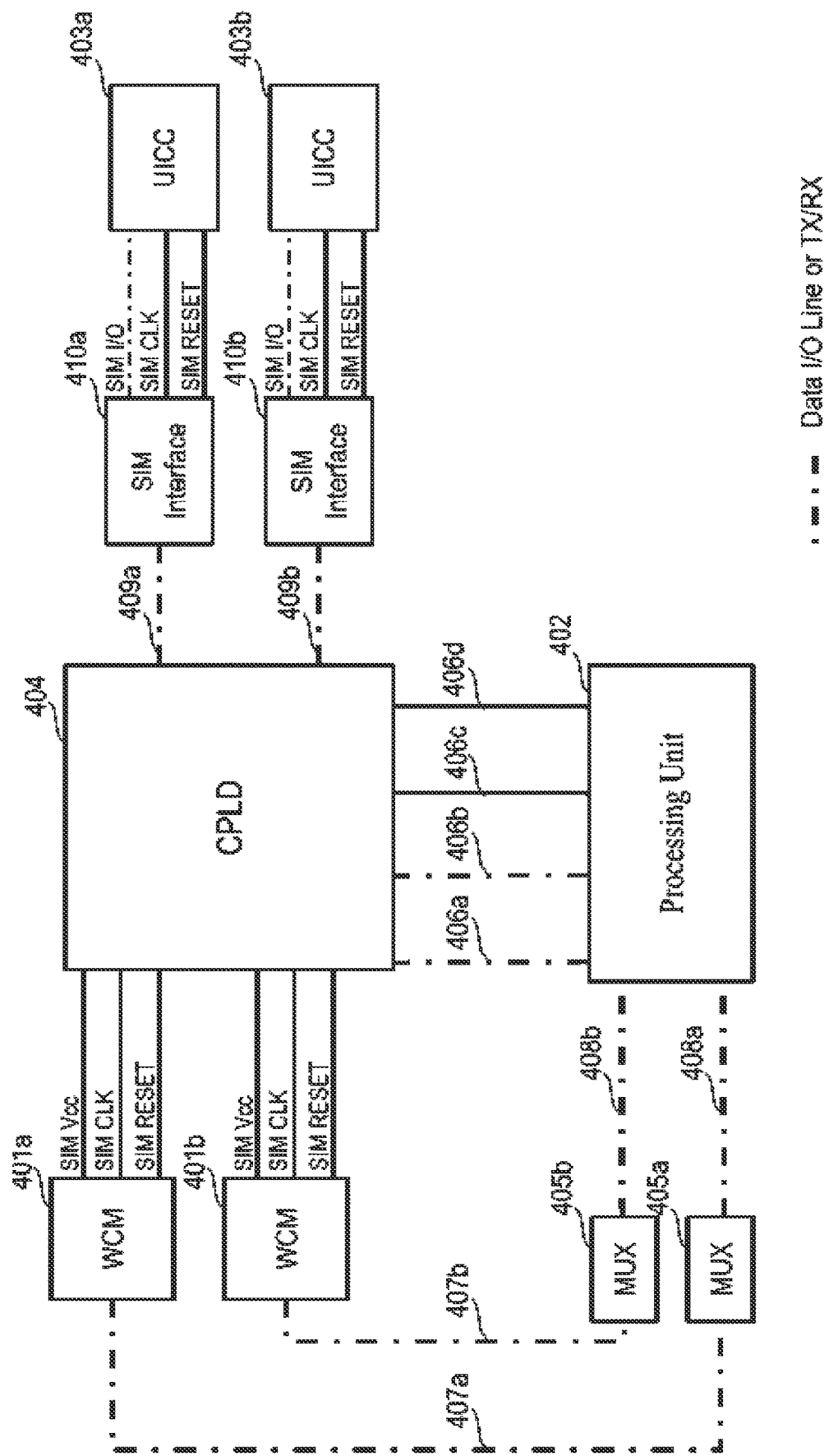
FIG. 4A is a block diagram illustrating the connection in the cellular router in detail according to the embodiments of the present invention.

FIG. 4A discloses a detailed connection between the processing unit, the plurality of WCMs and the plurality of SIMs in the cellular router according to the embodiments of the present invention. The cellular router comprises a plurality of WCMs, a plurality of multiplexers, a plurality of SIM interface, a processing unit and a selector. Each of the plurality of SIM interfaces is connected to one of the plurality of SIMs. Each of the plurality of SIMs may be a removableSIM or eUICC. The dash-dot lines indicate the connection used to transmit the I/O signal between the components.

For illustrative purposes, WCM 401*a* and WCM 401 b are the plurality of WCMs, MUX 405*a* and MUX 405*b* are the plurality of multiplexers, and UICC 403*a* and UICC 403*b* are the plurality of SIMs connected to a plurality of SIM interface 410*a* and 410*b*.

Power is provided to each of the plurality of SIM interfaces and the CPLD. CPLD further provides SIM voltage to the SIM housed in or coupled to each of the plurality of WCMs.

The SIM clock signal and the SIM reset signal are transmitted from one of the plurality of WCM, such as WCM 401*a*, to one of the plurality of SIM, such as UICC 403*a*, through the selector. The selector may be implemented by the processor, decoder, CPLD, multiplexer or combinations thereof. For illustrative purposes, the selector is implemented by CPLD 404.

A first selection signal is transmitted through connection 406*c*. Connection 406*c* may comprise one or more connections for processing unit 402 to select one of the UICC from UICC 403*a* and UICC 403*b* through CPLD 404.

A second selection signal is transmitted through connection 406*d*. Connection 406*d* may comprise one or more connections for processing unit 402 to select one of the WCM from WCMs 401*a* and 401*b*.

The data transmission between WCM 401*a* and UICC 403*a* is described herein in detail.

The first I/O pin of CPLD 404 may connect to the first I/O pin of SIM interface 410*a* as data connection 409*a*, and the second I/O pin of SIM interface 410*a* further connects to the I/O pin (C7) of UICC 403*a*. The second I/O pin of CPLD 404 may also connect to the first I/O pin of processing unit 402 as connection 406*a*. The second I/O pin of processing unit 402 may further connect to WCM 401*a* through MUX 405*a*, data connection 407*a* and data connection 408*a*. Connection 406*a* is for transmitting and receiving data between one of the UICC connected to CPLD 404 and WCM 401*a*, while connection 406*b* is only for transmitting and receiving data between one of the UICC connected to CPLD 404 and WCM 401*b*. For example, if the information request or response information is transmitted and received between WCM 401*b* and UICC 403*b*, then the information request or response information is transmitted and received through data connection 407*b*, data connection 408*b*, connection 406*b* and data connection 409*b*.

The number of data connections, the number of WCMs and the number of multiplexers must be the same.

In one example, The first I/O pin of CPLD 404, the second I/O pin of CPLD 404, the first I/O pin of SIM interface 410*a*, the first I/O pin of processing unit 402, and the second I/O pin of processing unit 402 may be implemented by a serial port.

In one example, the serial port is UART. The information request or response information is transmitted through transmit (TX) and receive (RX) pins for standard serial UART communication.

In another example, the serial port is General-purpose input/output (GPIO).

In one variant, the selector may be replaced by a multiplexer, but the number of WCM and the number of SIM connected to the multiplexer are limited. For example, if CPLD 404 is replaced by a 2-to-1 multiplexer, only one WCM and 2 SIMs are connected to the 2-to-1 multiplexer.

Figure 4B:
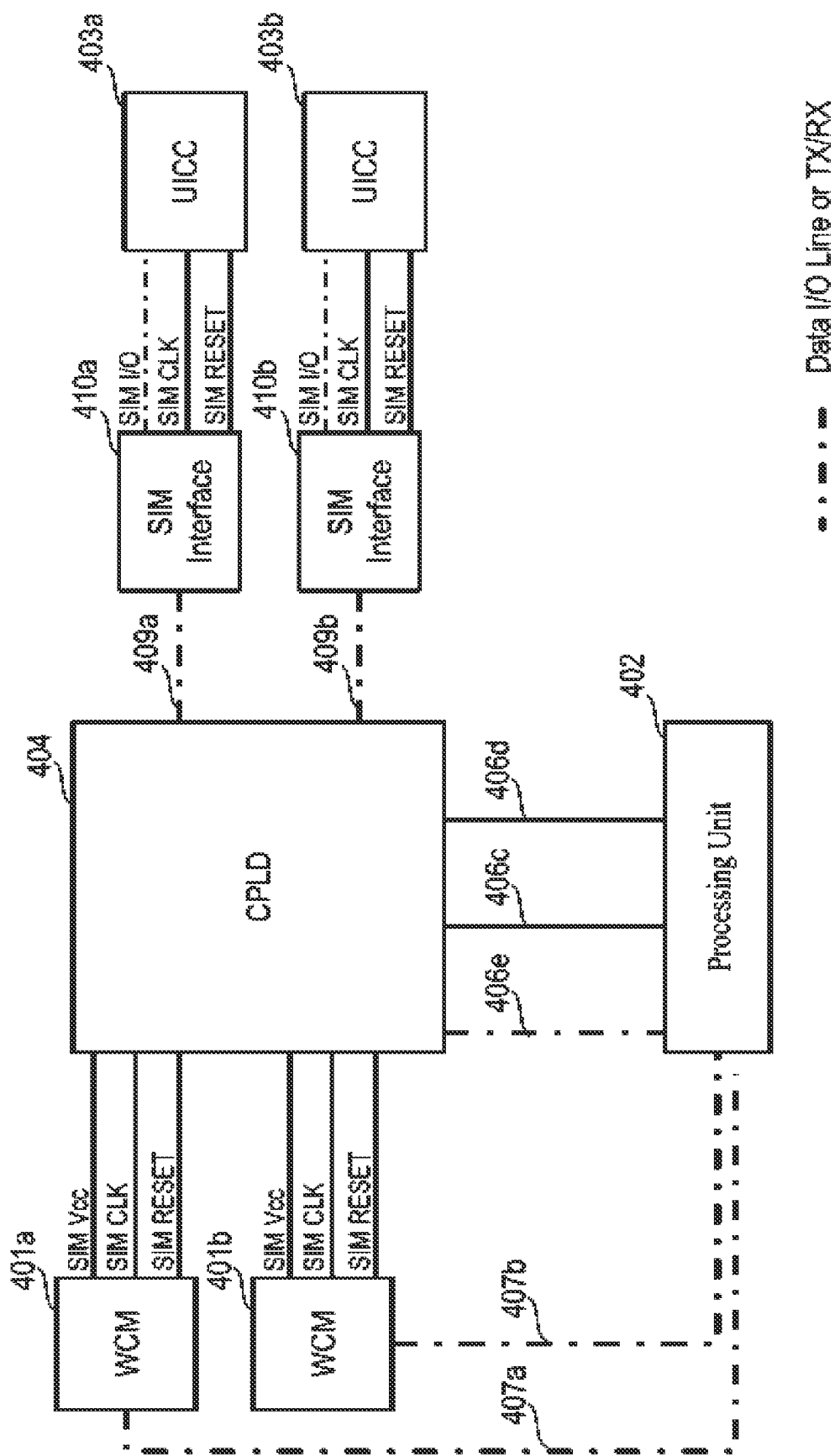
FIG. 4B is another block diagram illustrating the connection in the cellular router in detail according to the embodiments of the present invention.

FIG. 4B illustrates the connections between the processing unit, the plurality of WCMs and the plurality of SIMs in the cellular router according to the embodiment of the present invention. Similar to FIG. 4A, the only difference is the connection between the plurality of WCMs and the CPLD, data connections 407 and data connections 408. In view of FIG. 4A, connection 406*e* is connection 406*a* or connection 406*b*. The information request or response information may be transmitted and received between any of the WCMs 401*a* or 401*b* and one of the SIM through connection 406*e*.

Figure 4C:
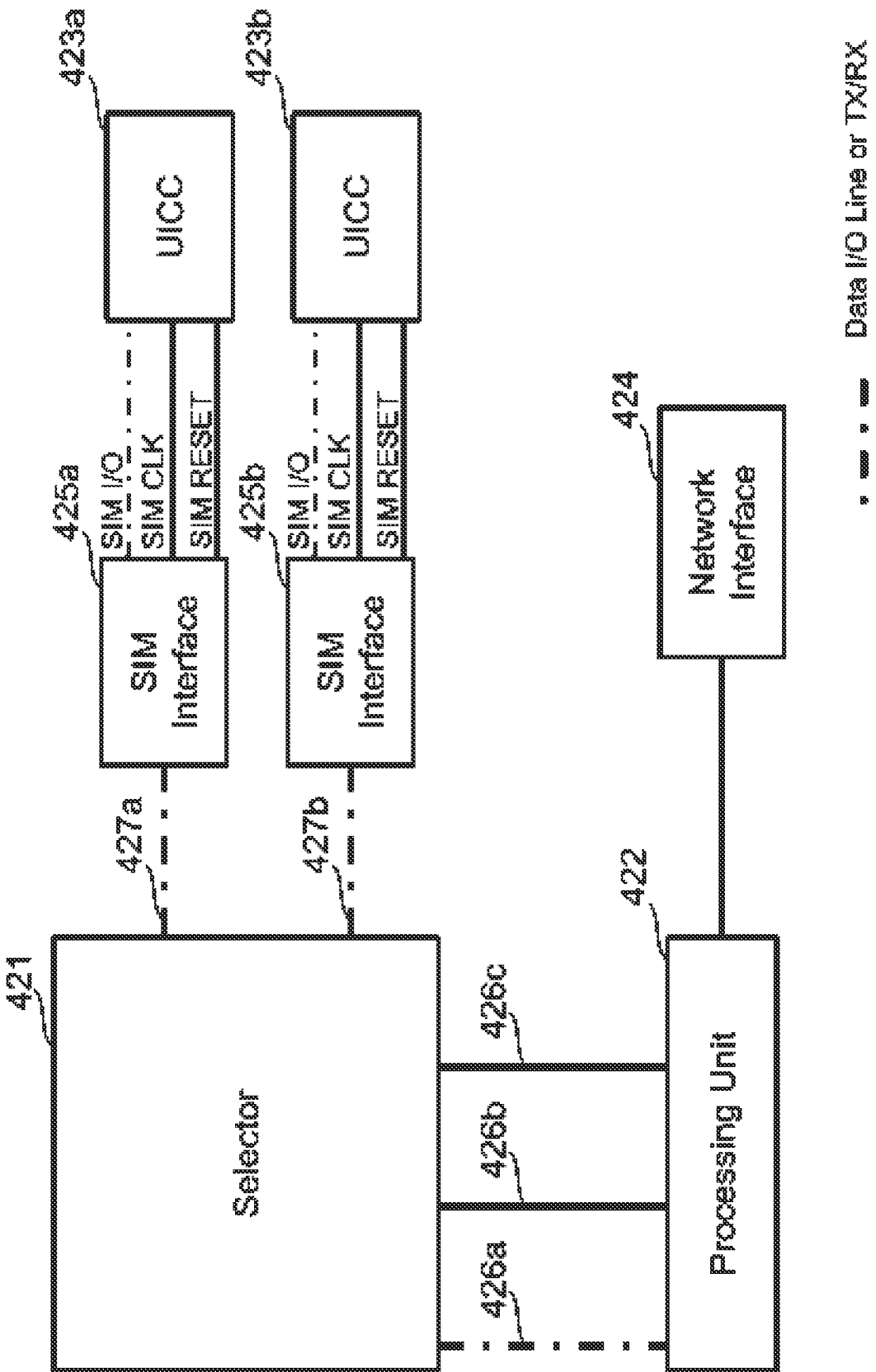
FIG. 4C is a block diagram illustrating the connection in the MSA in detail according to the embodiments of the present invention.

FIG. 4C illustrates the connections between the network interface in the MSA and one of the plurality of UICCs through a selector. FIG. 4C comprises network interface 424, processing unit 422, selector 421, SIM interfaces 425*a* and 425*b*, UICCs 423*a* and 423*b*, data connections 427*a*, 427*b* and 426*a*, and connections 426*b* and 426*c*. Since there is no WCM in the MSA, the MSA may receive the information request through the network interface. For example, in view of FIG. 2B, network interface 424, processing unit 422, selector 421, SIM interface 425*a* and UICC 423*a* may be network interface 204*a*, processing unit 201, MCU 210, SIM interface 206*a* and UICC 207*a* respectively.

Figure 11:
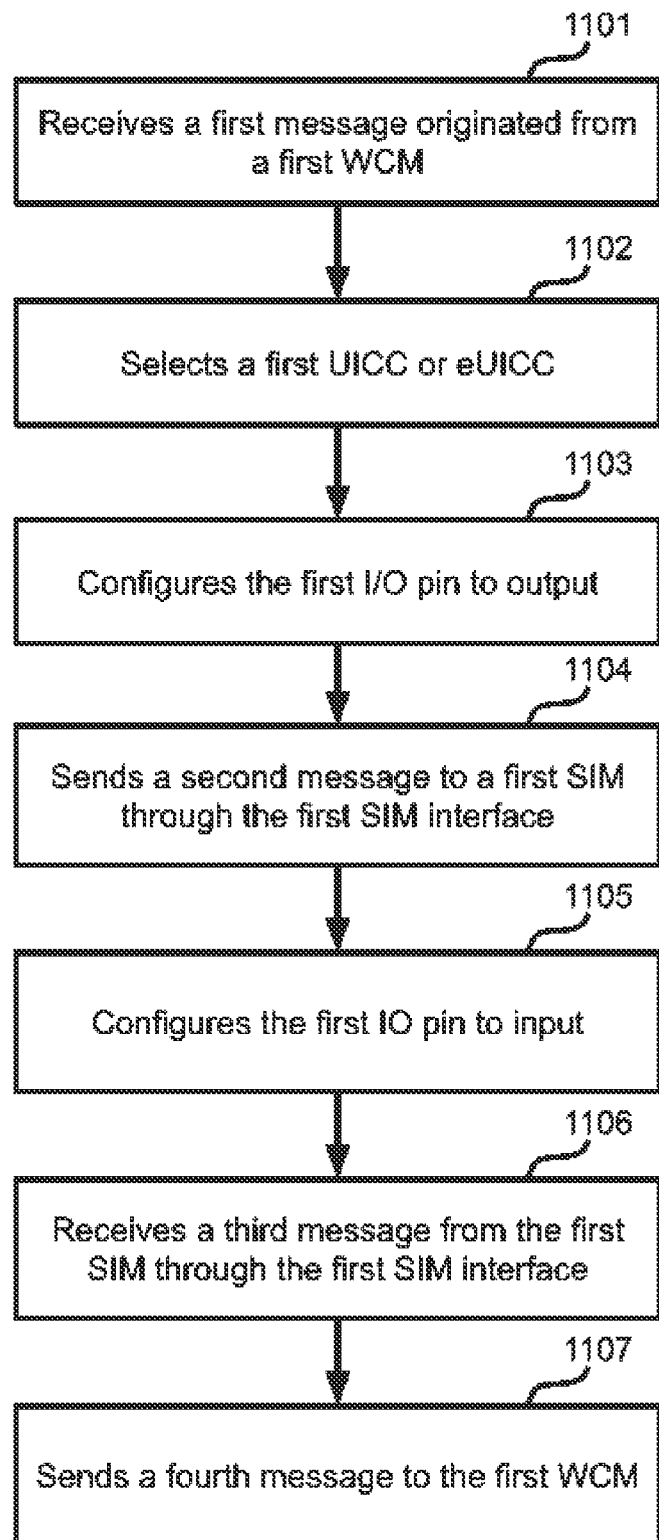
FIG. 11 is a flowchart illustrating processes for controlling pin direction according to the embodiments of the present invention.

Similar to FIGS. 4A and 4B, the method illustrated in FIG. 11 may also be performed in an MSA. Details of FIG. 11 will be discussed later.

In one variant, Time-division multiplexing (TDM) is applied for transmitting and receiving data through a single connection. The response information and the information request are transmitted and received in each in different directions in different time domains. For example, the time domain is divided into several recurrent time slots of fixed length, one for each sub-channel. A sample byte or data block of sub-channel 1 is transmitted during time slot 1, sub-channel 2 during time slot 2.

FIG. 5A illustrates a user interface to show the operational status for all UICC or eUICC on the cloud platform according to the embodiments of the present invention. User interface 500 has three columns. The first column illustrates the location of SIM cards, which may be UICCs and eUICCs. The second column illustrates identifiers of SIM profiles. The third column illustrates the operational status of SIM profiles.

As an MSA may have hundreds of slots capable of housing UICCs and may also have hundreds of eUICCs, the UICC/eUICC Location column is to help an administrator to locate a UICC or an eUICC. Optionally, when there is a plurality of MSAs, the UICC/eUICC Location column may be amended with the location of an MSA. Alternatively, another column may be added to illustrate the location of the MSA. In one example, slot 3 is housing or embedded with an eUICC and the eUICC is capable of holding a plurality of SIM profiles. In order to distinguish the plurality of SIM profiles, "A" and "B" are added after "Slot 3" to illustrate that the eUICC is holding two SIM profiles, which are identified with "520031234567890" and "520031234567891" respectively.

There are a myriad of ways to represent SIM profile identifiers. For example,
IMSIs may be used as SIM profile IDs. For another example, a wireless carrier network operator may assign an identifier to the SIM profile or a SIM card purchased, and the identifier may be used as the SIM profile ID.

The operational status of one or more SIM profiles are also indicated in the user interface. In one example, "Not used" is used to illustrate that the SIM profile ID "502130123456789" at slot 2 is not being used; "Out of order" is used to illustrate that SIM profile ID "470010171566423" at slot 4 is not being used; "Being used by router ABC WCM 1" is used to illustrate that SIM profile ID "450000000000001" at slot 1 is used by WCM 1 of router ABC; "Being used by router XYZ WCM 2" is used to illustrate that SIM profile ID "520031234567890" at slot 3A is used by WCM 2 of router ABC; and "Being used by router XYZ WCM 3" is used to illustrate that SIM profile ID "520031234567891" at slot 3B is used by WCM 3 of router ABC. There is no limitation that the operational statuses are limited to "Not used", "Out of order", and "Being Used". Other texts, tables, charts, images, videos, audios may be used alone or in combination to illustrate operational statuses. For example, a flashing image may be added: "Out of order". It is preferable that for each SIM profile displayed in user interface 500, the corresponding operational status is also displayed in order to allow the administrator to have a quick view.

The operational status may be determined by communicating with the UICC or eUICC interested. For example, processing unit FIG. 5B illustrates a user interface to show the administrative status for all UICC or eUICC on the cloud platform according to the embodiments of the present invention. User interface 501 has three columns. The first column illustrates the location of SIM cards, which may be UICCs or eUICCs. The second column illustrates identifiers of SIM profiles. The third column illustrates the administrative status of SIM profiles. In the example of user interface 501, payment status is shown. However, other status in relation to administrative tasks may also be shown. For example, contact information, payment information, expiration date may also be illustrated in user interface 501. For readability, the same UICC/eUICC Location information and SIM profile ID information in user interface 500 is illustrated in user interface 501.

There is no limitation that user interfaces 500 and 501 must be separated.

User interfaces 500 and 501 may be combined to illustrate customized information to be displayed or sent to an administrator.

The administrative status of one or more SIM profiles are also indicated in the user interface. In one example, "Automatic payment, Next due date, Jul. 10 2021" is used to illustrate that the next payment date of SIM profile ID "450000000000001" at slot 1 is due on "Jul. 10, 2021" and it will be paid automatically; "Contract 7A39, Overdue, Feb. 2, 2021" is used to illustrate that payment date of SIM profile ID "502130123456789" at slot 2 is "Feb. 2, 2021" and it is overdue, and "Contract 7A39" indicates that the terms of SIM profile ID "502130123456789" if bounded by "Contract 7A39"; "Contract AT&T E1X37, Overdue, Feb. 2, 2021" is used to illustrate that SIM profile ID "520031234567890" at slot 3A is bounded by a contract E1X37 with AT&T (®) and is overdue; and "Contract AT&T E1X37, Overdue, Feb. 2, 2021" is used to illustrate that SIM profile ID "520031234567891" at slot 3B is also bounded by the contract Eb1X37 with AT&T (®) and is also overdue; "Unknown" is used to illustrate that the administration status of SIM profile ID "470010171566423" at slot 4 is not known. There is no limitation that the administrative statuses are limited to the text shown in user interface 501. Other texts, tables, charts, images, videos, audios may be used alone or in combination to illustrate operational statuses. For example, a flashing image may be added: "Unknown". It is preferable that for each SIM profile displayed in user interface 501, the corresponding operational status is also displayed.

The source of administrative status may be retrieved from a server and/or a database. For example, administrative status of SIM profile ID "450000000000001" may be determined from a record of a database. The administrative status of SIM profile ID "502130123456789" may be determined by sending an Unstructured Supplementary Service Data (USSD) code through a WCM, which may be a WCM at the MSA or at a cellular router. The administrative status of SIM profile ID "520031234567890" and "520031234567891" may be retrieved from AT&T (®) using an application programming interface (API) provided by AT&T (®).

The contents of user interfaces 500 and 501 may be realized using HyperText Markup Language codes, mobile apps, images, JavaScript Object Notation (JSON) data, or any other formats that a processing unit could use to generate a user interface. In one variant, a report is also printed by the processing unit. The content may be sent from MSA to a computer, a laptop or a mobile electronic device to display user interfaces 500 and 501. The content may also be created by a server, such as a MSA management server, after retrieving UICC and eUICC location information, SIM profile IDs, and operational status information from one or more MSA first. Then the server sends the content to an electronic device to generate user interface 500.

There is no limitation that only five rows are generated in user interfaces 500 and 501. For example, there may be two hundred rows for two hundred SIM profiles.

In one variant, the UICC/eUICC location may include one or more UICCs and eUICCs at one or more cellular routers, like cellular routers 100a and 100b. The SIM profile ID column may also include SIM profile IDs corresponding to the UICCs and eUICCs of the cellular routers. Then the operational status and administrative status will also include the status of the corresponding SIM profiles.

Figure 6A:
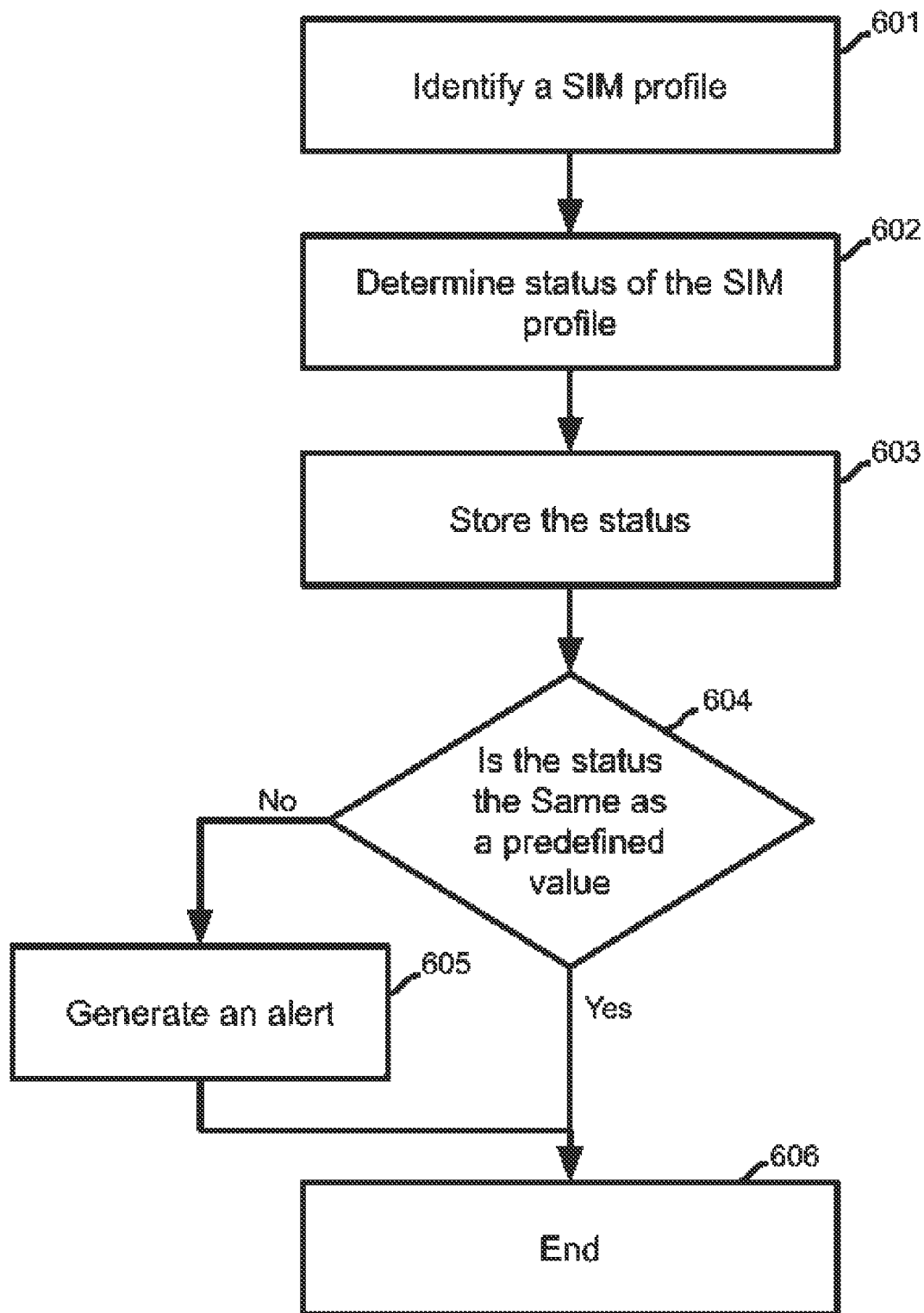
FIG. 6A is a flowchart illustrating processes of generating the user interface for SIM profile reporting according to the embodiments of the present invention.

FIG. 6A is a process flow illustrating one of the embodiments of the present invention. Processes 601-606 illustrate when an alert is generated regarding a SIM profile. There is no limitation to the type of alert. For example, the alert may be a change of operational status and/or administrative status in user interfaces 500 and 501. The alert may also be an email, a short message or a short message service (SMS) sent. Processes 601 to 606 may be performed at a cellular router, a MSA, and/or a MSA management server.

In process 601, a SIM profile is identified. There is no limitation on where the SIM profile is. For example, the SIM profile may be stored in an UICC in cellular router 100a. The SIM profile may also be stored in an eUICC of MSA 102b. In process 602, the status of the SIM profile is determined. Depending on the type of status to be determined and the location of the SIM profile, process 602 may be performed by the cellular router, MSA and MSA management server individually or together. As disclosed earlier regarding FIG. 5A and FIG. 5B, there are many ways to determine the operational status and administrative status of a SIM profile. For example the operational status and administrative status may be determined by communicating with the UICC/eUICC of the SIM profile; by communicating with the wireless carrier of the SIM profile, including API, USSD code, web site, email; and by retrieving data from a database.

There is no limitation to the type of status that may be determined, stored and compared in processes 601-606. For example, in addition to operation status and administrative status, network performance status for the connection established using the SIM profile, and other statu may also be determined, stored and compared.

In process 603, status is stored. There are many ways to store the status and the status could be represented in many formats. For example, the status could be represented in text format and be stored in a non-transitory computer-readable medium at one or more of the MSAs, at the MSA management server, at a cloud service provider and/or one or more of the cellular routers. The status may be stored, for example, in text format, binary format, XML format and/or in JSON format. The status may also be sent to a database for storage.

In process 604, the status of a SIM profile is compared to a predefined value. The predefined value may be provided by the administrator, by a vendor, by retrieving from a database, by a service level agreement, and/or by statistical analysis. For example, the payment due dates illustrated in FIG. 5B may be determined based on a contract agreement. In another example, the predefined operation status of SIM profile ID "470010171566423" should not be "Out of order". But when its status is changed "Out of order", an alert will be generated at process 605.

If the status is different from the predefined value, an alert will be generated at process 605. The process flow ends at process 606.

Figure 6B:
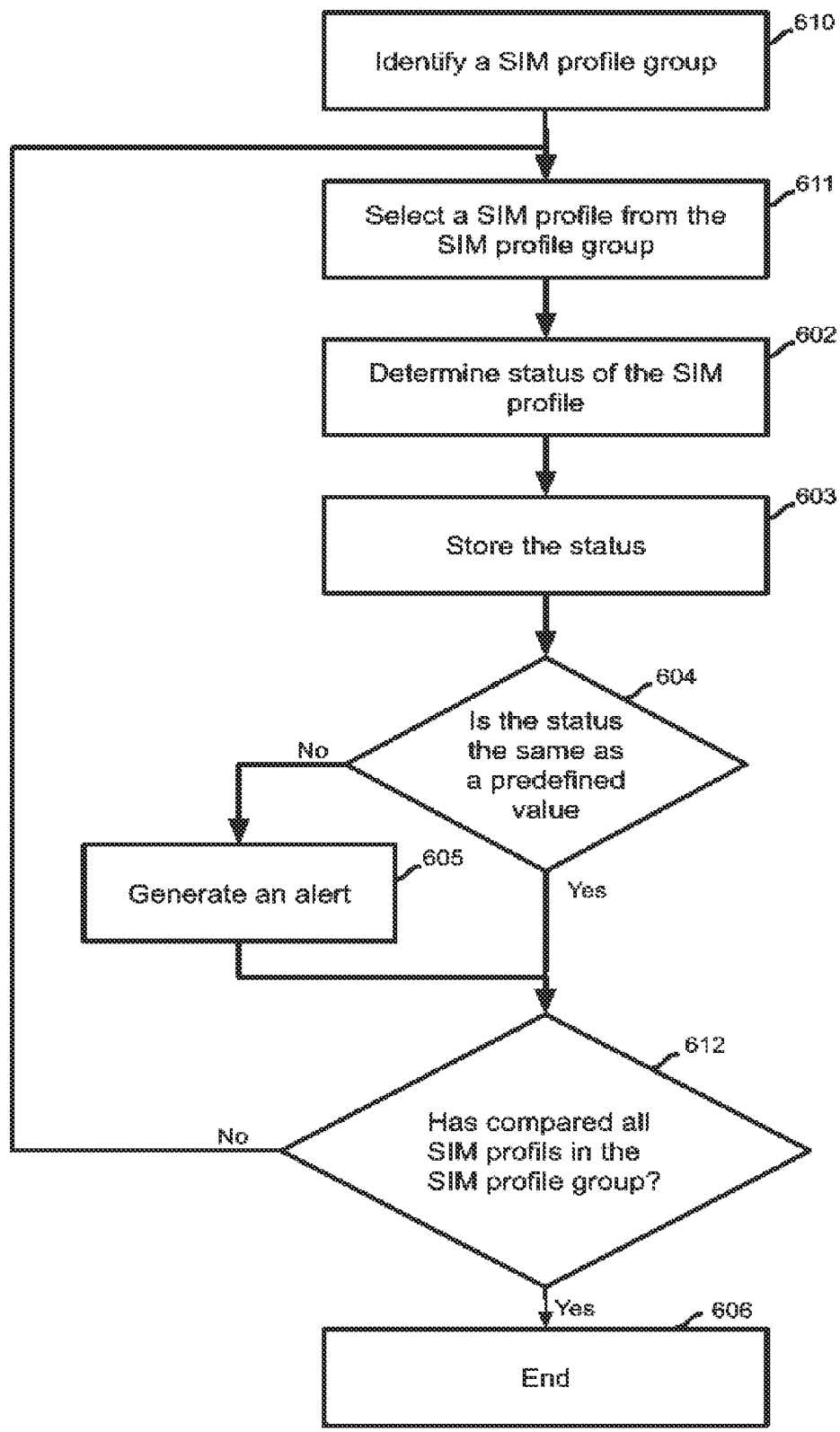
FIG. 6B is another flowchart illustrating processes of generating the user interface for SIM profile reporting according to the embodiments of the present invention.

In one variant, FIG. 6B is a process flow, based on FIG. 6A, illustrating one of the embodiments of the present invention. In process 610, a SIM profile group is defined. For example, a SIM profile of a UICC at cellular router 100a, a SIM profile of a UICC at cellular router 100b, a SIM profile of an eUICC at MSA 102a and two SIM profiles of one UICC and one eUICC are all grouped together to form a SIM profile group. Therefore this SIM profile group has five SIM profiles. There is no limitation on how a SIM profile group is defined. There is also no limitation on the number of SIM profile groups. For example, a MSA management server may create a plurality of SIM profile groups and assign SIM profiles from UICCs/eUICCs at different MSAs into the plurality of SIM profile groups.

In process 611 a SIM profile is selected from this SIM profile group. Then processes 602 to 605 are performed. In process 612, a processing unit will determine whether all SIM profiles have been processed through process 602 to 603. If yes, then the process flow will stop at process 606. If not, process 611 will be performed again.

Caching

FIG. 7A-7D are the process flows that illustrate methods for performing caching according to the embodiments of the present invention. The cache decision is performed in the processing unit of the cellular router. The cached data is response information and is temporarily stored in the storage unit of the cellular router.

Cellular router 100 may be identical to any of the cellular router 300a, 300b, 300c or 300d shown in FIGS. 3A, 3B, 3C, and 3D respectively. For illustrative purposes, cellular router 120 is cellular router 300a.

MSA 120 may be identical to any of the MSAs 200a, 200b or 200c shown in FIGS. 2A, 2B and 2C respectively. For illustrative purposes, MSA 120 is MSA 200a. MSA 120 may be in the same or different geographical area with cellular router 100. Cellular router 100 in geographical area A and MSA 120 in geographical area B is only for illusive purposes.

Figure 7A:
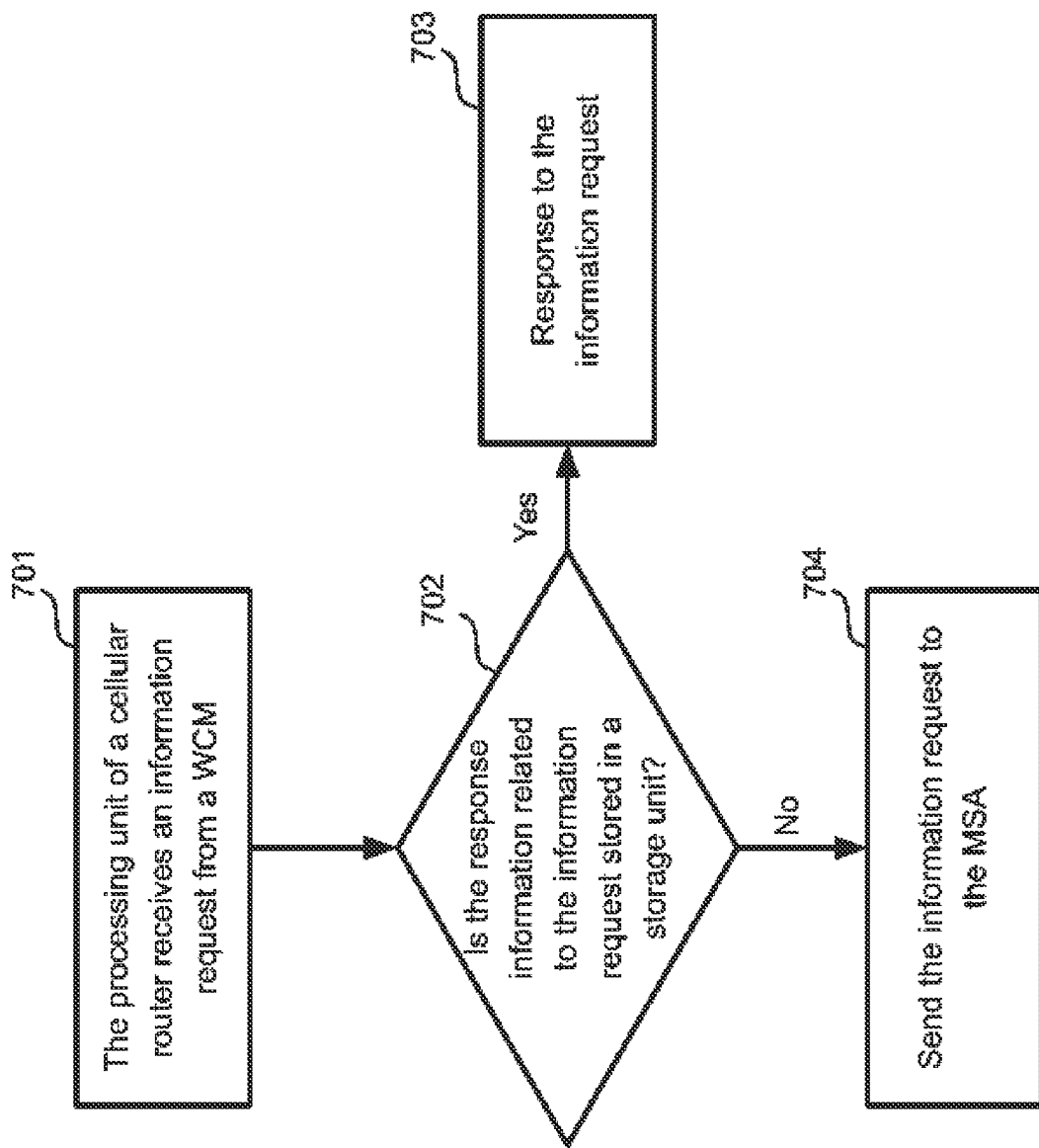
FIG. 7A is a flowchart illustrating processes of caching according to the embodiments of the present invention.

FIG. 7A is a process flow diagram illustrating a method for performing cache decision when processing unit 301 receiving an information request from one of the plurality of WCMs of cellular router 100, such as WCM 306a.

In process 701, processing unit 301 of cellular router 300a receives an information request from one of the plurality of WCMs, such as WCM 306a.

In process 702, processing unit 301 may determine a response information related to the information request stored in a storage unit, such as storage unit 303. If there is at least one response information related to the information request stored in storage unit 303, that means the response information is cached previously. Processing unit 301 may respond to the information request with a WCM response in process 703. The response information is one or more of the following: IMSI, source IP address, destination IP address, file type, file size, response data, and any non-authentication data related to WCM or the UICC.

In one embodiment, the WCM response is the response information.

In another embodiment, the WCM response is part of the response information.

In another embodiment, the WCM response is part of the response information. For example, only IMSI may be selected and stored in storage unit 303. In another example, only the source IP address, destination IP address are stored response data information.

In one embodiment, processing unit 301 may not send the information request to the MSA in process 703 when the response information is cached already.

In another embodiment, processing unit 301 may further send the information request to the MSA and update the response information stored in storage unit 303 in process 703.

In one variant, processing unit 301 may determine any response information related to the information request stored in an external storage device rather than a storage unit, the external storage device is accessible through any of the plurality of network interfaces 304.

In process 704, if there is no response information related to the information request stored in storage unit 303, then processing unit 301 may send the information request to the MSA and request for the response information.

Figure 7B:
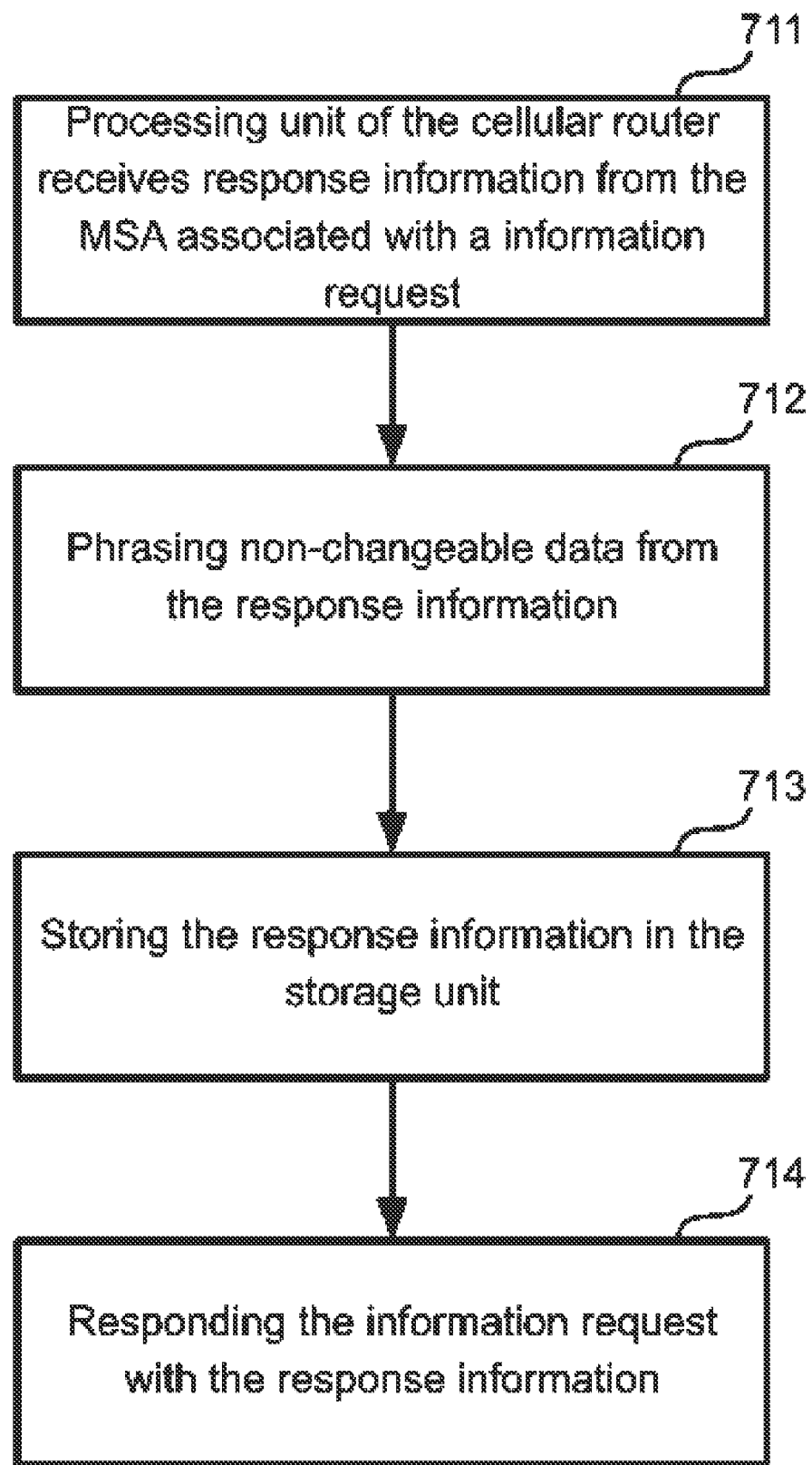
FIG. 7B is another flowchart illustrating processes of caching according to the embodiments of the present invention.

FIG. 7B is a process flow diagram illustrating a method for performing caching when processing unit 301 receiving response information from MSA 100, such as WCM 120.

In process 711, processing unit 301 receives response information from the MSA associated with the information request.

In process 712, processing unit 301 may phrase the data from the response information as a WCM response. In one example, only non-changeable data are phrased and cached in storage unit 303. In another example, processing unit 301 may cache all data from the response information as the WCM response. If all the data of the response information are phrased or all the data of the response information are cached without phrasing, the WCM response is the response information. Processing unit 301 may further phrase the data again before responding to the query in process 703.

In process 713, processing unit 301 stores the response information in the storage unit.

In one variant, if the capacity of storage unit 303 reaches its maximum capacity, processing unit 301 may not store the response information in storage unit 303.

In another variant, if the capacity of storage unit 303 reaches its maximum capacity, processing unit 301 may delete the data stored in storage unit 303, and store the response information in storage unit 303.

In process 714, processing unit 301 may respond to the information request with the WCM response. Details of the WCM responses are explained before.

Figure 7C:
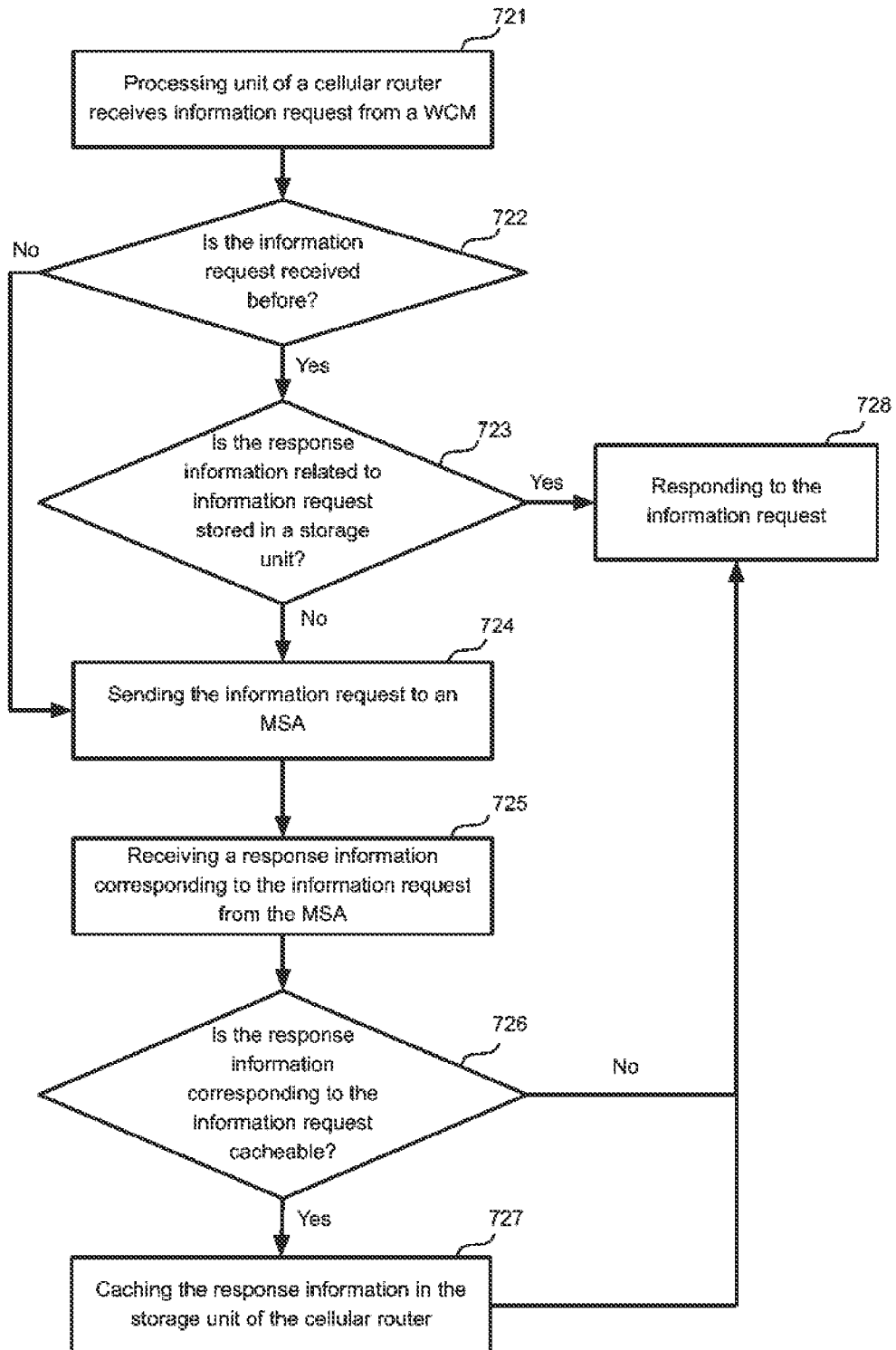
FIG. 7C is another flowchart illustrating processes of caching according to the embodiments of the present invention.

FIG. 7C is a process flow diagram illustrating a method for performing caching in a processing unit of a cellular router when receiving an information request from one of the plurality of WCM of a cellular router.

In process 721, processing unit 301 receives an information request from one of the plurality of WCM.

In process 722, processing unit 301 may determine if the same information request is received before. If the same information request is not received before, process 723 is skipped and processing unit 301 may perform process 724 directly.

In process 723, processing unit 301 may determine any response information related to the information request stored in storage unit 303. Details of the determination are discussed in the paragraph related to process 702. If there is at least one response information related to the information request stored in storage unit 303, processing unit 301 may respond to the information request with a WCM response in process 728.

In process 724, processing unit 301 may send the information request to the MSA.

In process 725, after a period of time, processing unit 301 may receive a response information corresponding to the information request from the MSA.

In process 726, processing unit 301 may determine if the received response information is cacheable. If the information request is not cacheable, process 727 is skipped and processing unit 301 may perform process 728 directly.

In process 727, processing unit 301 may cache the information request and the response information corresponding to the information request in storage unit 303 of cellular router 300*a*. The cached response information is the WCM response as discussed in process 702 and process 712.

In one variant, processing unit 301 may receive only one information request at a time.

In another variant, processing unit 301 may receive more than one information request at the same time. Therefore, a table or database is used to associate the response information to a corresponding information request. There is no limitation on the method to associate a response information to a corresponding information request. Using a table or database is only for illustration purposes only.

In process 728, processing unit 301 may respond to the information request by sending the WCM response to the WCM. The WCM response may be created or generated or retrieved depending on the response information cached in storage unit 303 of cellular router 300*a* previously, or the response information received from the MSA in process 725.

Figure 10A:
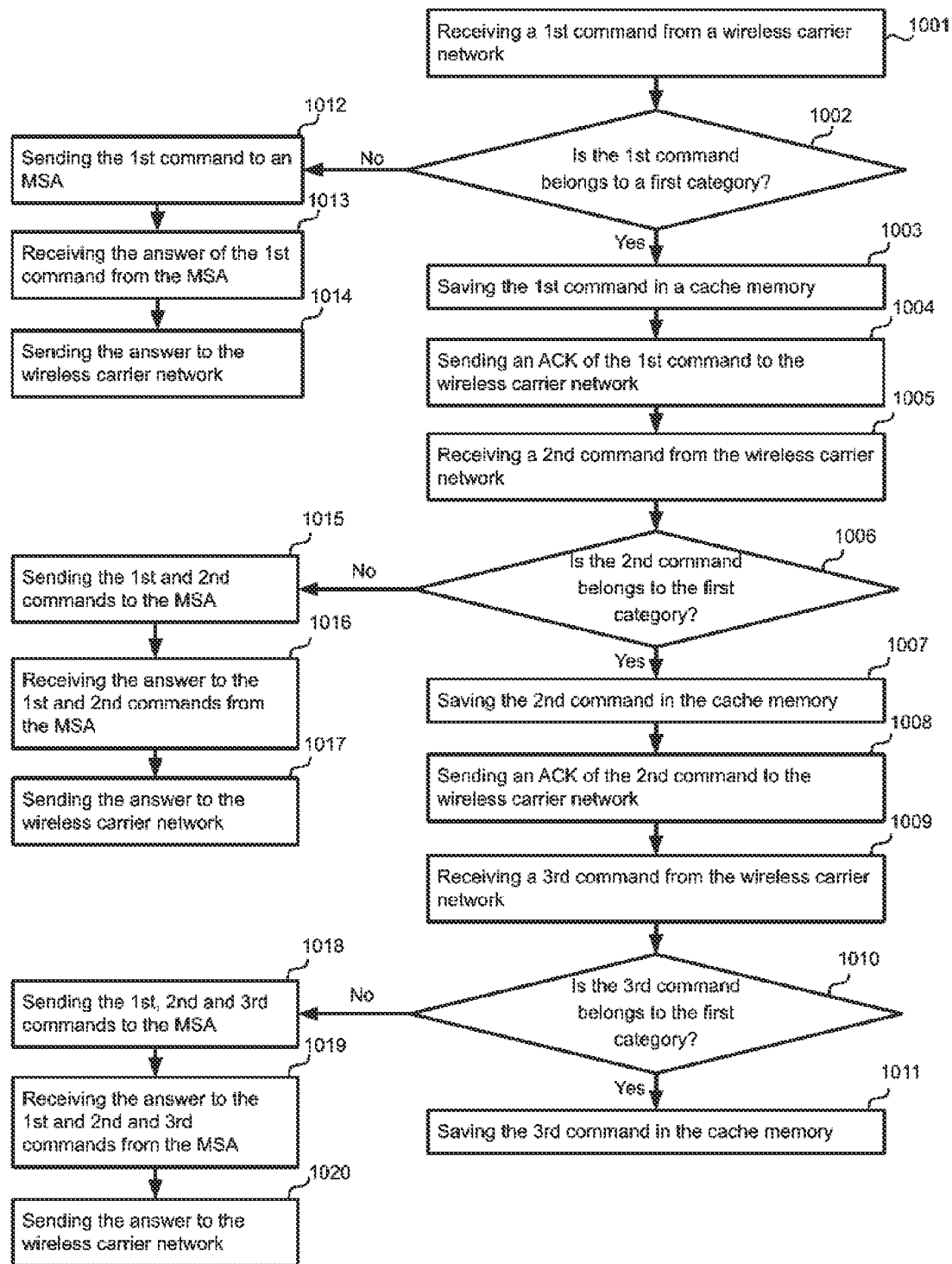
FIG. 10A illustrates a method for caching according to one of the embodiments of the present invention.

FIG. 10A illustrates a method for caching a plurality of commands at a cellular router and sending the plurality of commands to an MSA and the MSA may then reply with an answer according to one of the embodiments of the present invention. The commands received in process 1001, 1005 and 1008 may be saved in a batch file, and then the batch file may be sent to the MSA for the answer. There is no limitation that the command must be saved in a batch file. For example, the commands may be saved in a file that is able to be transmitted to the MSA. For illustration purposes, the commands may have originated from a wireless carrier network. The commands may also have originated from a WCM.

Generally when a device (e.g. cellular router) housing a SIM profile receives a command from a wireless carrier network of the SIM profile, the cellular router forwards the command to the UICC or eUICC storing the SIM profile, receives an answer responsive to the command from the UICC or eUICC, and then forwards the answer to the wireless carrier network. The commands sent by a wireless carrier network may include a plurality of commands including one or more repetitive commands and at least one non-repetitive command at the end to indicate the completion of the plurality of commands. The plurality of commands may also comprise sequential commands. The term "repetitive command" is used to refer to a command which is sent by a wireless carrier more than one time in a data communication session between a SIM profile and its wireless carrier network. For example, a wireless carrier network may send a plurality of commands in sequence, like "Select IMSI", "Select ICCID", and "Send". As the "select" command is sent repeatedly twice, it is a repetitive command. Commands are not limited to only these three commands. Also, the command may have different naming conventions. For example, any command indicating an ending to the commands may be considered as the "Send" command. As the "Send" command is received only once, it is a non-repetitive command.

Generally, in the prior art cellular communication technique, when a cellular router will receive the first select commands (e.g. "select IMSI"), the cellular router will forward the command to a UICC or eUICC storing the respective SIM profile instantly. The UICC or eUICC may then send a reply to the cellular router, here the reply may indicate that "IMSI is selected", the cellular router then will forward the reply to the wireless carrier network. The wireless carrier network may then send the second command (e.g. "select ICCID"). The cellular router will respond to the second command similarly, i.e. forward the command to the UICC or eUICC, receive the reply from the UICC or eUICC and then forward the reply to the wireless carrier network. In this example, the reply of the second command may indicate that "ICCID is selected". After that, the wireless carrier network may send the third command (e.g. "send"). Then the cellular router will send the third command to the UICC or eUICC in the same manner. In response to the third command, the UICC or eUICC will send the IMSI and ICCID to the cellular router. Then the cellular router will forward the reply to the wireless carrier network. Therefore, the wireless carrier network will receive the IMSI, and ICCID information of the UICC or eUICC only after receiving the response of the third command.

According to the present embodiment disclosed in FIG. 10A, the cellular router may not forward the first and second command to the UICC or eUICC immediately after receiving it from the wireless carrier network as these are repetitive commands. In this embodiment, the router may first save the first and second commands in cache memory or in a batch file to create a batch of commands and when the third command is received, the cellular router will then forward the first, second and third commands together to the UICC or eUICC storing the respective SIM profile as the third command is non-repetitive command which indicating a completion of commands. After that, the router may forward the answer (the IMSI and the ICCID) of the first, second and third command to the wireless carrier network after receiving it from the UICC or eUICC.

In another instance, if the third command is also a repetitive command, i.e. an instruction to select further content, the cellular router may also save the third command in the cache memory or in the batch file and may not forwards the commands to the UICC or eUICC until a non-repetitive command indicating a completion of commands is received. Therefore, according to the present embodiment, the cellular router may have to communicate with UICC only once even though the router receives a plurality of commands having multiple repetitive commands from the wireless carrier network. Therefore, this will substantially save the time in communication between a UICC and its wireless carrier network. The method will be even more time saving especially in cases where the cellular router uses UICCs or eUICCs which are housed in a remote device such as in an MSA disclosed herein.

The term "command" may be used interchangeably with the terms "request" or "query". For illustration purposes, in this embodiment a command may be a request from a wireless carrier network for selecting a SIM profile, a request for sending specific SIM profile information and/or a request for a key challenge response. There is no limitation on the content of a command that may be sent by wireless carrier network or a WCM. The term "answer" used in the disclosure may represent a response to a request or an acknowledgement of performing an action in response to an instruction or a command.

In process 1001, the processing unit of a cellular router receives a first command from a wireless carrier network. For illustration purposes, the first command is received at cellular router 100a. In process 1002, the processing unit of cellular router 100a determines whether the first command belongs to a first category of commands. The term "first category" is used in the disclosure to refer to the repetitive commands and the term "non-first category" is used to refer to the non-repetitive commands.

If the first command belongs to the first category, that means the first command is a repetitive command. Therefore, in process 1003, the first command is saved in a cache memory by the processing unit of cellular router 100a. In one variant, repetitive commands may also be saved in a batch file to create a batch of commands.

On the other hand, when the first command belongs to a non-first category command, the method proceeds to process 1012. In process 1012, the processing unit of cellular router 100a sends the first command to an MSA, such as MSA 102a. After that, MSA 102a may send an answer to the first command which is then received by cellular router 100a in process 1013. Then in process 1014, the processing unit of cellular router 100a forwards the answer to the first command to the wireless carrier network.

When a command is cached, the cellular router still needs to send an acknowledgement (ACK) to the command as the wireless carrier network may await for the ACK corresponding to the command and may not send further commands until the ACK corresponding to the command is received. Therefore, in process 1004, cellular router 100a sends an ACK corresponding to the first command to the wireless carrier network. In the present embodiment, the ACK corresponding to the first command is a dummy ACK. The term "dummy ACK" is used to refer to an ACK that is sent in response to a command for which the action of the command is not performed. The dummy ACK has the same contents as a real ACK.

In process 1005, a second command is received from the wireless carrier network. In process 1006, the processing unit of cellular router 100a determines whether the second command belongs to the first category of commands.

If the second command belongs to the first category, that means the second command is a repetitive command. Therefore, in process 1007, the processing unit of cellular router 100a saves the second command in the cache memory or in the batch file. If the second command belongs to a non-first category command, the method proceeds to process 1015. In process 1015, the processing unit of cellular router 100a sends the second command and the first command from the cache memory together to MSA 102a. After that, MSA 102a may send an answer to the first and second commands which is then received by cellular router 100a in process 1016. Then in process 1017, the processing unit of cellular router 100a forwards the answer to the first and second commands to the wireless carrier network.

In process 1008, the cellular router 100a sends an ACK corresponding to the second command to the wireless carrier network. The ACK corresponding to the second command is also a dummy ACK, when the second command is cached and the action of the second command is not performed.

In process 1009, a third command is received from the wireless carrier network. In process 1010, the processing unit of cellular router 100a determines whether the third command belongs to the first category of commands. When the third command belongs to a non-first category command, the method proceeds to process 1018. In process 1018, the processing unit of cellular router 100a sends the first, second and third commands to an MSA, such as MSA 102a. After that, MSA 102a may send an answer to the first, second and third commands which is then received by cellular router 100a in process 1019. Then in process 1020, the processing unit of cellular router 100a forwards the answer to the first, second and thirds commands to the wireless carrier network.

If the third command belongs to the first category, in process 1011, the processing unit of cellular router 100a may save the third command in the cache memory. Cellular router 100a may keep saving the commands in the cache memory until a non-repetitive command is received from the wireless carrier network. When a non-repetitive command is received, cellular router 100a may forward the non-repetitive command along with the cached commands to the MSA. After receiving the answer of the commands from the MSA, cellular router 100a may forward the answer to the wireless carrier network, thus, the process ends.

Figure 10B:
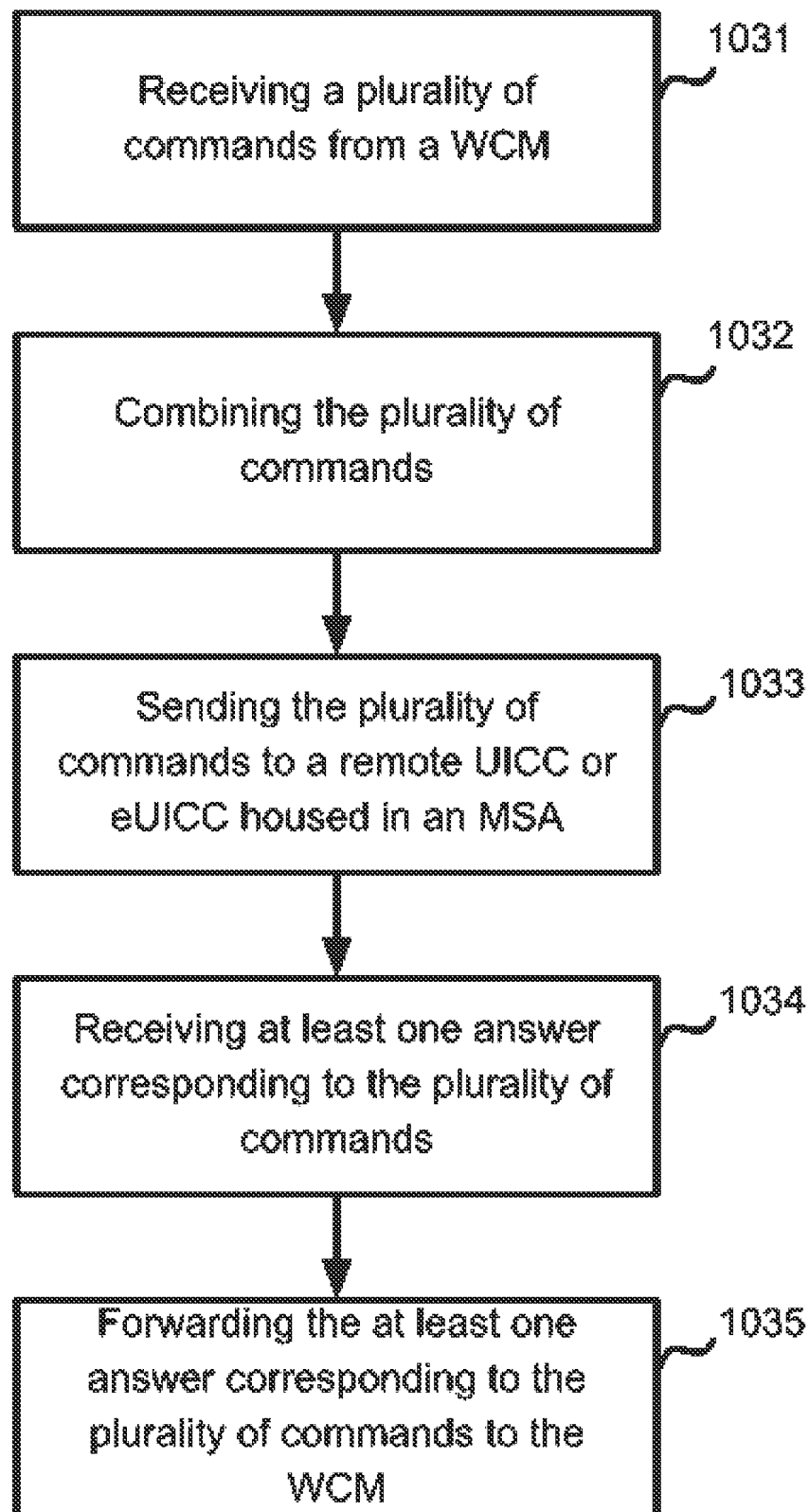
FIG. 10B is another flowchart illustrating processes of caching according to the embodiments of the present invention.

There is no limitation on the number of commands being considered to be cached and sent as a batch of commands to the MSA. Three commands and three iterations illustrated in FIG. 10B is only for illustrative purposes. If more commands are received from the wireless carrier network, more iteration is performed.

FIG. 10B illustrates a variation of the method disclosed in FIG. 10A. FIG. 10B discloses receiving a plurality of commands together from a wireless carrier network regardless of receiving ACK for each of the plurality of commands where FIG. 10A disclose receiving a plurality of commands one by one after receiving a ACK of each of the plurality of commands. The method disclosed in FIG. 10A may be performed by a processing unit of a cellular router, such as cellular router 100a.

In process 1031, the processing unit of cellular router 100a receives a plurality of commands from a WCM. The plurality of commands may be originally generated by a wireless carrier network and received by the WCM from the wireless carrier network. In one variant, the plurality of commands may also be generated by the WCM. The WCM may be housed at cellular route 100a or connected externally. In one variant, the plurality of commands may be received together as a group of commands. In another variant, the plurality of commands may be received one by one as a series of commands, however, without any requirement for sending an ACK in response to each command of the plurality of commands.

In process 1032, the processing unit of cellular router 100a combines the plurality of commands. The plurality of commands may be combined in a batch file to create a batch of commands. In one variant, process 1032 is omitted when the plurality of commands are already in group.

In process 1033, the processing unit of cellular router 100a sends the plurality of commands to an MSA housing a UICC or eUICC storing a SIM profile to which the plurality of commands is designated to. For example, the MSA housing the UICC or eUICC storing the SIM profile is MSA 102a.

In process 1034, cellular router 100a receives at least one answer corresponding to the plurality of commands from MSA 102a. MSA 102a may receive the at least one answer corresponding to the plurality of commands from the UICC or eUICC storing the SIM profile.

In process 1035, the processing unit of cellular router 100a forwards the at least one answer corresponding to the plurality of commands to the WCM. The WCM may further forward the at least one answer to a wireless carrier network when the plurality of commands is initially received by the WCM from the wireless carrier network.

Figure 8A:
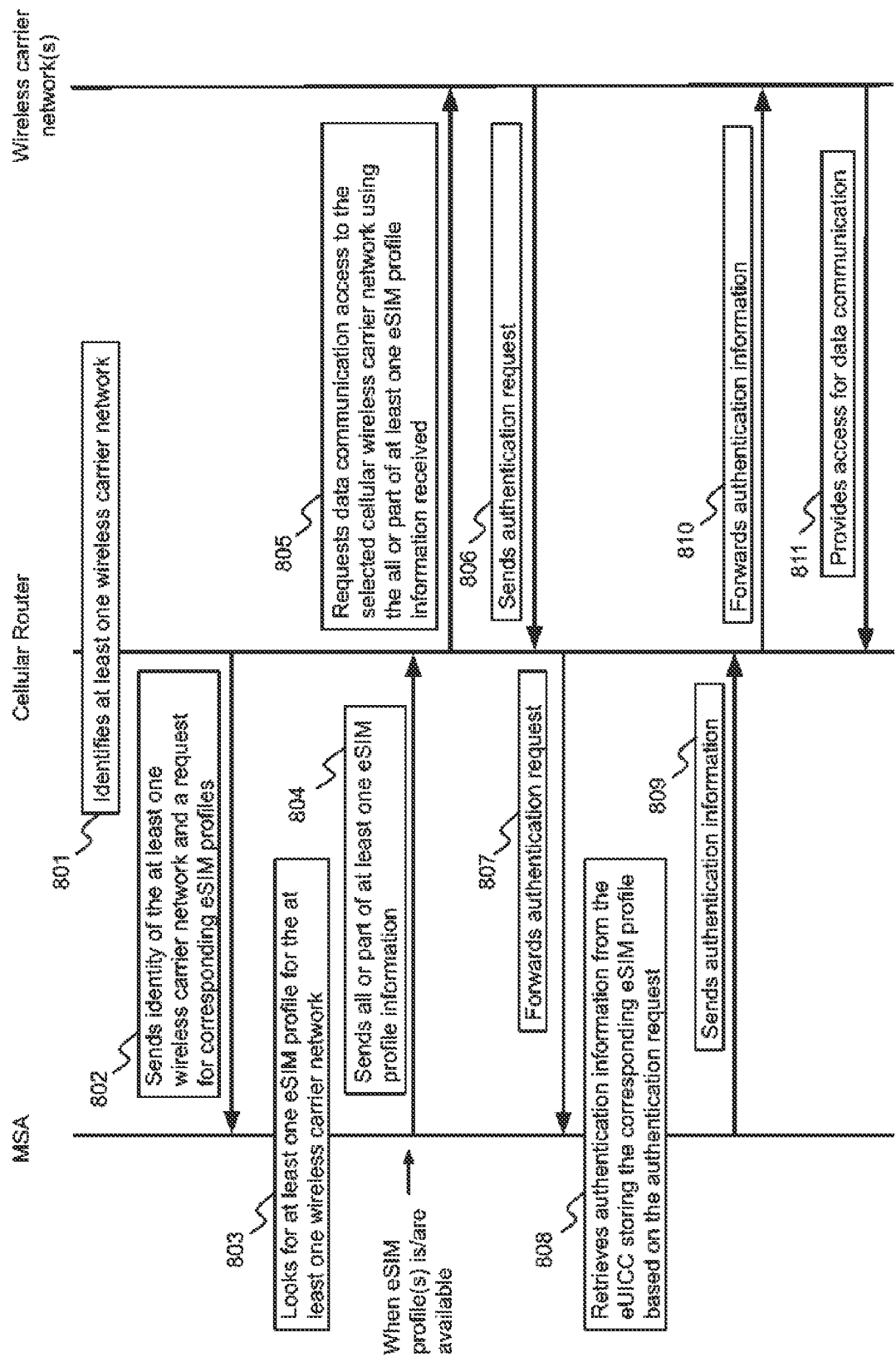
FIG. 8A illustrates a prior art method for establishing at least one wireless carrier connection at a cellular router using at least one eSIM profile stored in an MSA.

FIG. 8A illustrates a prior art method for establishing at least one wireless carrier connection at a cellular router using at least one eSIM profile stored in an MSA. The prior art has an establishment of the wireless carrier connection using eSIM profiles that are already stored in the MSA, and the downloading of the eSIM profiles is initiated by an MSA management server.

In process 801, cellular router 100a may identify at least one wireless carrier network available in its current geographical area.

In process 802, the processing unit of cellular router 100a sends wireless carrier network identity information of at least one wireless carrier network to an MSA.

In process 803, the processing unit of MSA 102a uses the wireless carrier network identity information to determine whether at least one eSIM profile belonging to the at least one wireless carrier network is available at MSA 102a.

In process 804, MSA 102a sends all or part of at least one eSIM profile information to cellular router 100a.

In process 805, cellular router 100a sends a request for data communication access to at least one corresponding wireless carrier network of the at least one eSIM profile of which information is received.

Figure 8B:
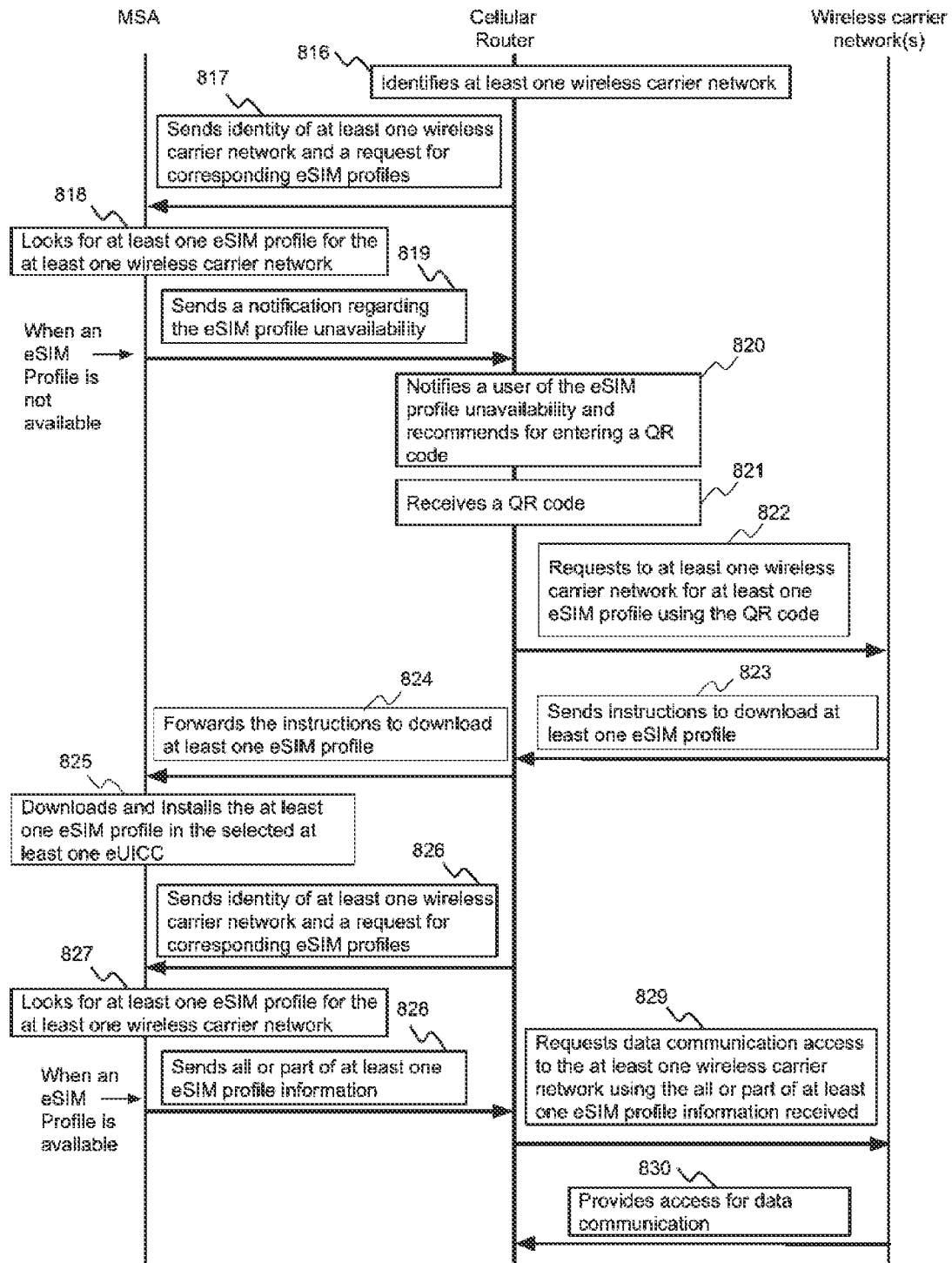
FIG. 8B illustrates a method for downloading an eSIM profile initiated by a cellular router according to one embodiment of the present invention.

Processes 801-803 and processes 804-805 illustrated in FIG. 8A are identical to processes 816-818 and processes 828-829 illustrated in FIG. 8B. Details of processes 801-803 and processes 828-829 may be further discussed in processes 816-818.

In process 806, cellular router 100a receives an authentication request from the at least one wireless carrier network, and forwards the authentication request to the MSA in process 807.

In process 808, MSA may retrieve authentication information from the eUICC storing the corresponding eSIM profile based on the authentication request, and send the retrieved authentication information back to cellular router 100a in process 809.

In process 810, cellular router 100a may forward the authentication request to the wireless carrier network when receiving it from the MSA.

In process 811, wireless carrier network provides access for data communication to cellular router 100a and connection is established.

FIG. 8B illustrates a method according to one embodiment of the present invention. Compared to the prior art, the present embodiment allows downloading of an eSIM profile to be initiated by a cellular router. Then, the MSA could download the eSIM profile through the cellular router and install the downloaded eSIM profile in an eUICC of the MSA. There are many ways for the cellular router to initiate the download. For example, the initiation may occur when a type of eSIM profile is not available at the MSA. The initiation may also occur under an instruction from an administrator of the cellular router or the MSA. For example, the cellular router is in the coverage of cellular operator A but there is no SIM profile that could be used for cellular operator A, then cellular router initiates the eSIM downloading process. The eSIM profile is to be stored at an eUICC housed in the MSA.

In process 816, a processing unit of a cellular router, such as cellular router 100a identifies at least one wireless carrier network available in its current geographical area. The at least one wireless carrier network may be identified by performing a scan using an available WCM at cellular router 100a. The WCM may comprise an antenna for transmitting and receiving radio signals. The antenna may be connected externally to the WCM. Without limiting the scope of the present invention, cellular router 100a may be fixed, as such, used in a particular geographical area, or it may be mobile, thus, capable of being used in different geographical areas depending on use cases.

In process 817, the processing unit of cellular router 100a sends wireless carrier network identity information of at least one wireless carrier network to an MSA (e,g, MSA 102a) and requests for at least one eSIM profile of the at least one wireless carrier network. In one variant, at least one wireless carrier network of which identity information is sent in process 817 is the same as the at least one wireless carrier network identified in process 816. In another variant, at least one wireless carrier network of which identity information is sent in process 817 is one of the at least one wireless carrier network identified. In process 818, the processing unit of MSA 102a uses the wireless carrier network identity information to determine whether at least one eSIM profile belonging to the at least one wireless carrier network is available at MSA 102a.

When at least one eSIM profile is available, the processing unit of MSA 102a proceeds to perform process 828 to send all or part of information of at least one eSIM profile from the available at least one eSIM profile to cellular router 100a to establish wireless carrier connection.

However, when no eSIM profile is found as available in process 818, MSA 102a sends a notification regarding the eSIM profile unavailability to cellular router 100a in process 819. In process 820, upon receiving the notification from MSA 102a, cellular router 100a may notify a user or administrator that no eSIM profile is found and requests for an input, for example, the input may be a machine-readable code, such as a quick response (QR) code. In one variant, in process 820, upon receiving the notification from MSA 102a, cellular router 100a may notify a user or administrator that no eSIM profile is found and terminate the method. There is no limitation on the techniques of notifying a user or administrator; any means of notification may be used. For example, the MSA or a MSA management server managing the MSA may send an email to notify one or more users or administrators. In one variant, cellular router 100a may comprise a display unit and the notification may be displayed on the display unit.

In process 821, the processing unit of cellular router 100a receives the QR code entered by the user. The user or administrator may receive the QR code offline from a sales point of an MNO or online through email, or messages from a web portal or server of the respective MNO. In process 822, cellular router 100a sends a request to at least one wireless carrier network for at least one eSIM profile using the QR code. The at least one wireless carrier network to which the request for eSIM profile is sent in process 822 is the same wireless carrier network of which the QR code is entered by the user. Optionally, instead of using QR code, other authentication method may be used to verify the download request of the eSIM profile.

In process 823, cellular router 100a receives instructions to download at least one eSIM profile from the at least one wireless carrier network. After sending the request in process 822 and before receiving the download instruction in process 823, several other communications may occur among MSA 102a, cellular router 100a and the at least one wireless carrier network regarding authentication and/or identification purposes. In order to avoid obscuring the description such details are not provided here. In Process 824, cellular router 100a forwards the instructions to download at least one eSIM profile to MSA 102a. In process 825, the processing unit of MSA 102a performs the functions of downloading and installing of the at least one eSIM profile according to the instructions received.

After that, processes 826 and 827 are performed in the same manner as described in processes 817 and 818 respectively. In process 828, MSA 102a sends all or part of at least one eSIM profile information to cellular router 100a instead of sending a notification of eSIM profile unavailability disclosed in process 819, as this time at least one eSIM profile should be available since in process 825 at least one eSIM profile is already downloaded and installed.

Upon receiving the all or part of information of the at least one eSIM profile from MSA 102a, in process 829, cellular router 100a sends a request for data communication access to at least one corresponding wireless carrier network of the at least one eSIM profile of which information is received. The request is sent using the all or part of information received in process 828. The request may be sent over the Internet. Based on the validity of the information sent by cellular router 100a, the wireless carrier network may provide access to cellular router 100a for data communication in process 830.

Figure 9A:
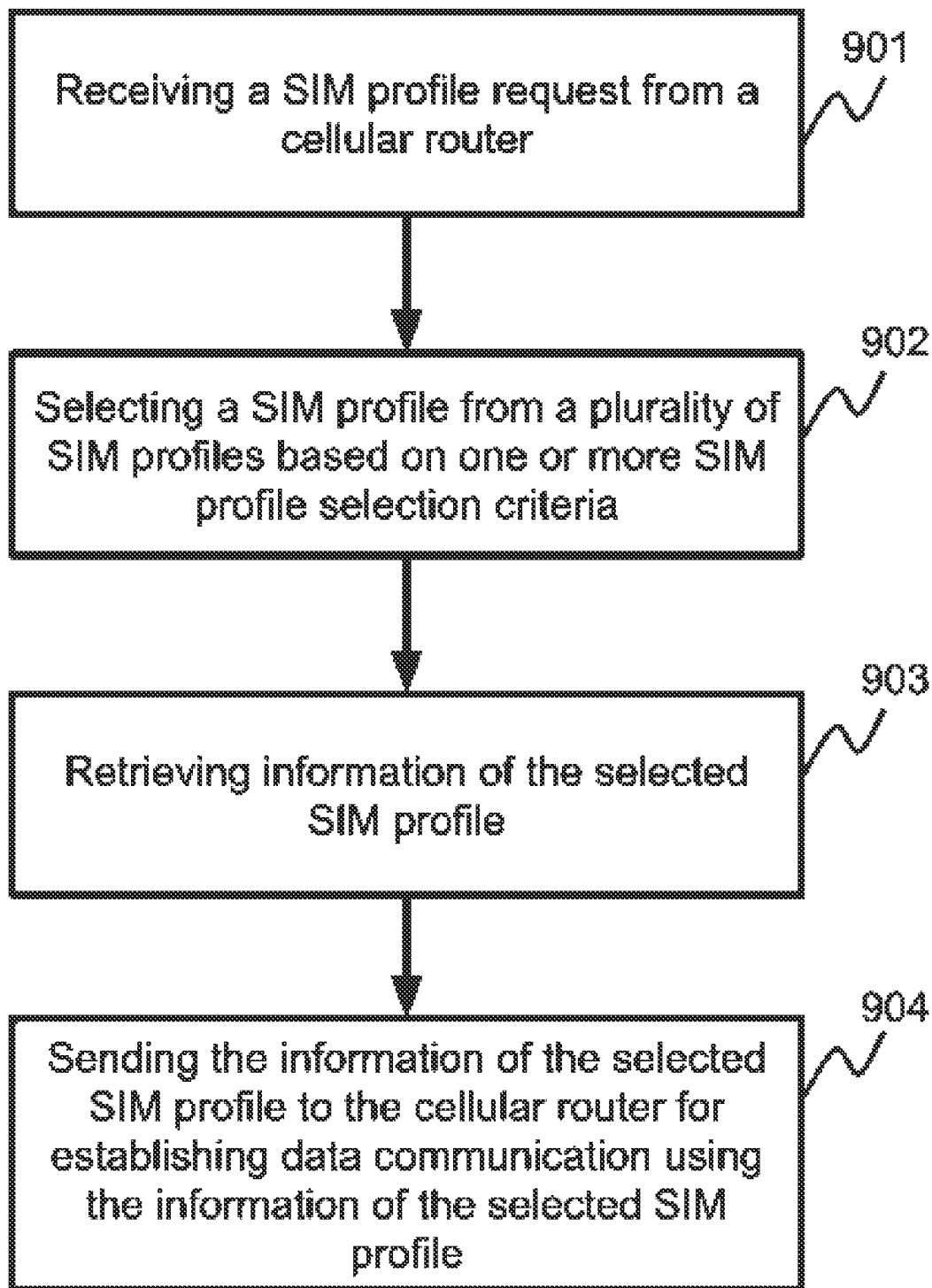
FIG. 9A illustrates a method for the selection of a SIM profile according to one embodiment of the present invention.

FIG. 9A illustrates a method for the selection of a SIM profile according to one embodiment of the present invention. Although those who are skilled in the art may have different methods for selecting SIM profiles, the present embodiment allows selection of a SIM profile based on additional SIM profile selection criteria.

The process disclosed in FIG. 9A should be viewed in conjunction with FIG. 1A. For example, the process disclosed in FIG. 9A may be performed by a processing unit of an MSA. For example, the method is performed by the processing unit MSA 102a shown in FIG. 1A. MSA 102a may be similar to any of the MSAs shown in FIGS. 2A-2C.

In one variant, the method for the selection of SIM profiles illustrated in FIG. 9A may be performed by a processing unit of an MSA management server (not shown). The MSA management server may be remotely or locally connected to a plurality of MSAs. The plurality of MSAs may be managed and/or controlled by the MSA management server to perform SIM selection and SIM assignment between the MSAs and a plurality of cellular routers. There may be no direct connection between the MSAs and the cellular routers when an MSA management server is used. The cellular routers may be connected to the MSA management server and can communicate with the MSAs through the MSA management server.

In process 901, a SIM profile information request is received at MSA 102a from a cellular router, such as cellular router 100a. Cellular router 100a may be similar to any of the cellular routers shown in FIGS. 3A-3D. Before process 901, MSA 102a and cellular router 100a should be connected. The connection between MSA 102a and cellular router 100a may be established through interconnected networks, such as interconnected networks 103 shown in FIG. 1A. There is no limitation on the means for accessing interconnected networks by MSA 102a and cellular router 100a. For illustration purposes, MSA 102a and cellular router 100a may access interconnected networks over wired network connections, such as cabled network connection, fiber optics network connection or digital subscriber line (DSL) network connection, or over wireless carrier network connections, such as Wi-Fi (®), satellite connection or wireless carrier network connection.

In process 902, the processing unit of MSA 102a selects a SIM profile from a plurality of SIM profiles based on one or more SIM profile selection criteria. A SIM profile may be stored in a UICC or an eUICC. To be more specific, a SIM profile that is stored in an eUICC may also be referred to as an eSIM profile. Each SIM profile represents a SIM module. In case there is only one SIM profile in a UICC or eUICC, the processing unit could also use the SIM profile selection policy to select a UICC or eUICC. The SIM profile selection criteria may include, but not limited to, one or more of the following: SIM profile category, frequency band supported by a SIM profile, frequency bands supported by a wireless carrier network corresponding to a SIM profile, tariff price, network's performance history of a SIM profile, services offered by the wireless carrier network of a SIM profile, the service quality of the wireless carrier network of a SIM profile, administrator's preference, geolocation of cellular router 100a, billing cycle information, position of a SIM profile placed in an MSA and time.

When the geolocation of a cellular router is used for SIM profile selection policy, longitude and latitude information obtained from a GPS receiver at cellular router 100a may be used to look-up for available wireless carrier networks at the geographical location of cellular router 100a.

When the frequency band is to be used for the selection of a SIM profile, the frequency band(s) supported by the SIM profile, and the frequency band(s) supported by a wireless carrier network corresponding to the SIM profile is considered. In an exemplary scenario, a user may be willing to use a specific band, such as band 14, for better performance. A user may be willing to use a specific band because of having information of a frequency band's good strength in his geographical area. A band may also be chosen based on a signal strength measurement of bands performed by a cellular router. For example, fifty SIM profiles available in an MSA. Out of the fifty SIM profiles only three SIM profiles may support band 14, therefore, a SIM profile may be selected from the three SIM profiles. In another exemplary scenario, when band 14 is only available for a SIM profile, then that SIM profile should be selected. In one variant, band selection is used in combination with other criteria to further narrow down the SIM profile selection. For example, when five SIM profiles out of fifty SIM profiles are available for an expected band, one or more other criteria from the aforementioned SIM profile selection criteria may be used to further filter out four SIM profiles out of the five SIM profiles so that the selected SIM profile is the closest to the user's expectation to fulfill user's satisfaction.

When a SIM profile or eSIM profile is selected based on the position of a UICC or eUICC, storing the SIM profile or the eSIM profile, placed in an MSA. A SIM profile should be selected from a UICC or eUICC that is positioned first. In order to select SIM profiles based on position, UICCs and/or eUICCs housed in MSA 102a should be positioned in a numerical or alphabetical order.

For example, when a SIM profile is selected based on the tariff price, a SIM profile with the lowest tariff offer may be selected. It is possible that wireless carrier networks may change tariffs periodically. A SIM profile with the lowest tariff may no longer be the SIM profile with the lowest tariff. Therefore, the processing unit of MSA 102a may inspect the tariff price information from time to time and whenever a change in tariff is detected, the processing unit redetermines on which SIM profile has the lowest tariff price.

A SIM profile may also be selected based on billing cycle information. A billing cycle is the period of a cellular subscription for communication service. A billing cycle may be weekly, monthly or yearly. In one exemplary scenario, where using billing cycle information may be beneficial is, data usage limit per billing cycle may be capped and exceeding the allowed data usage limit may incur high premiums. Therefore, when a SIM profile is selected based on billing cycle information, the SIM profile for which data usage limit of a billing cycle is about to reach, may not be selected.

A SIM profile may also be selected based on the time. There are many reasons for selecting a SIM profile based on time, one example may be for the changes in tariff pricing. Some wireless carrier networks may offer different tariff prices for different times. It is very common that wireless carrier networks offer lower tariff rates during off-peak periods. Therefore, a SIM profile from the wireless carrier network which offers the lowest tariff price for a specific time may be selected when the selection occurs during that specified time.

A SIM profile may be selected based on the user's preference. A user of cellular router 100a or MSA 102a may assign priority level to each SIM profile. Thus, when selecting a SIM profile based on the user's preference, a SIM profile with higher priority assigned may be selected. A user may assign priority level to a SIM profile based on different bases including the selection criteria disclosed herein.

A SIM profile may also be selected based on the service quality of the wireless carrier network of a SIM profile. When selecting a SIM profile based on the service quality, a SIM profile from the wireless carrier network with better service quality may be selected. The service quality of a wireless carrier network may be evaluated based on different criteria including, but not limited to, network coverage, security and simplicity of configuration.

In process 903, the processing unit of MSA 102a retrieves information from the selected SIM profile. In one example, the processing unit retrieves all the information from the selection SIM profile. In another example, only part of the information is retrieved.

In process 904, the processing unit of MSA 102a sends the retrieved information of the selected SIM profile to cellular router 100a for establishing data communication by the cellular router. There is no limitation with which the data communication is to be established. The data communication may be established with a host, a server, another router or the MSA.

Figure 9B:
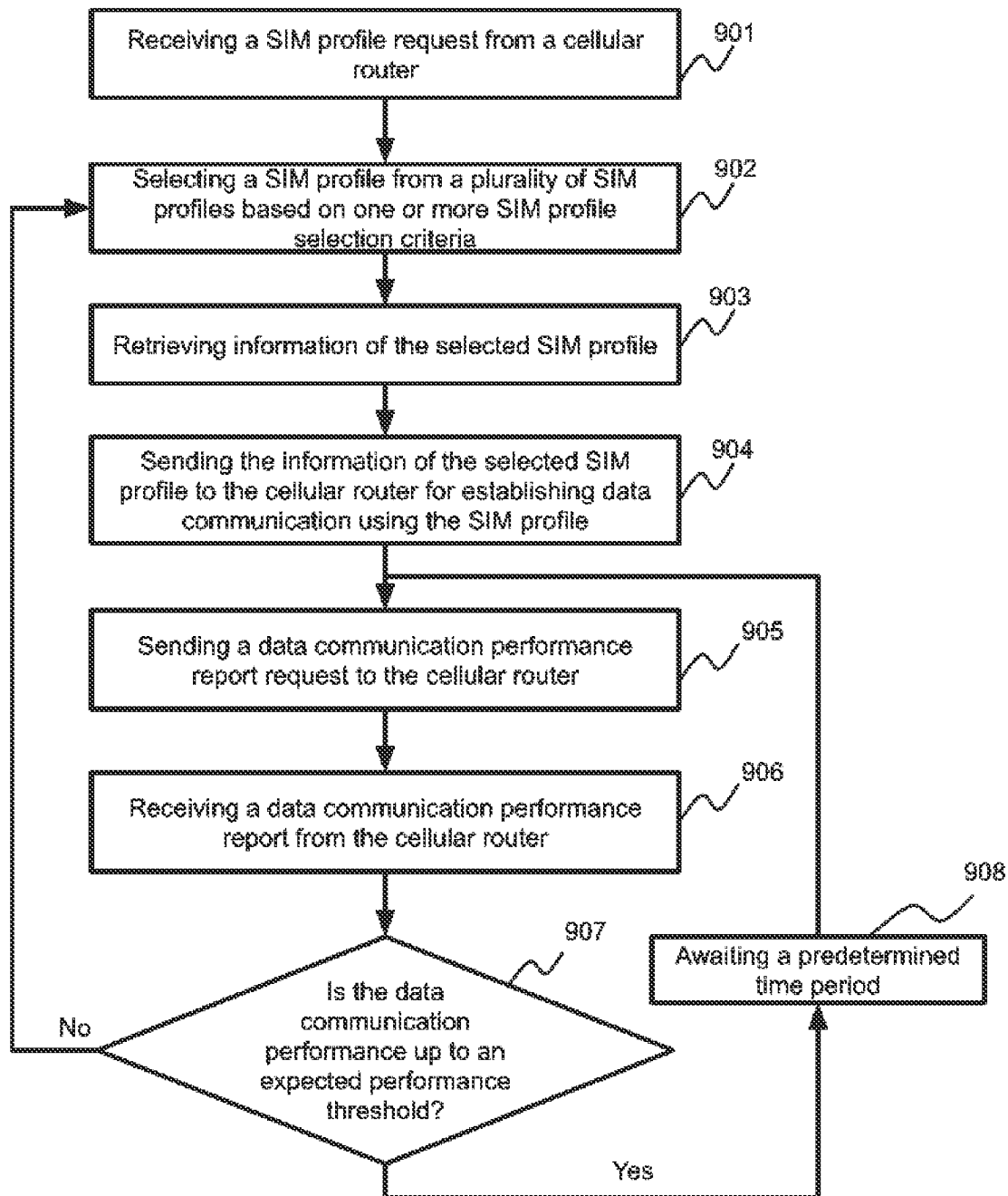
FIG. 9B illustrates extended method for the selection of SIM profile according to one embodiment of the present invention.

FIG. 9B illustrates a method for the selection of SIM profile and monitoring data communication performance according to one embodiment of the present invention. FIG. 9B depicts an extended version of FIG. 9A. Those who are skilled in the art may have methods for the selection of remote SIM profiles based on SIM profile selection policy where the selection is performed at a cellular router (wireless communication device). However, according to the exemplary embodiment disclosed herein, SIM profile selection may be performed at the MSA. A processing unit of the MSA may select a SIM profile based on one or more factors. For example, one of the factors is data communication performance monitoring performed at a cellular router. In process 905, the processing unit of MSA 102a sends a data communication performance report request to cellular router 100a. In process 906, the processing unit of MSA 102a receives the data communication performance report from cellular router 100a.

In process 907, based on the data communication performance report, the processing unit of MSA 102a may determine whether the data communication performance is up to an expected performance threshold. When the data communication performance is up to the expected performance threshold, process 908 is performed.

In process 908, the processing unit of MSA 102a awaits a predetermined time period, then iterates processes 905-907. In one variant, process 905 may be omitted, and cellular router 100a may send data communication performance reports at the predetermined time proactively without waiting for a request from MSA 102a. The time value of the predetermined time period may be set by default by the manufacturer, received from an input by a user or administrator, received from a remote server, or calculated by an application based on statistical analysis that is most efficient for the performance of the method.

However, when the data communication performance is not up to the expected performance threshold, process 902 is performed again to select another SIM profile from the plurality of SIM profiles in the similar manner disclosed under process 902, then the subsequent processes are iterated. There may be various reasons for the data communication performance not being up to the expected performance. In one exemplary scenario, the data communication performance may not be up to the expected performance because of a failure in connections due to operational issues like maintenance of the cellular router, equipment failure in cellular router or MSA, congestion, operator error or any other failure that may result in connection failure.

In another exemplary scenario, the expected performance threshold may be based on the speed of data transmission. For example, an expected speed of data transmission may be set to 5 Mbps. A data communication performance report may show the current speed of data transmission in 4Mbps, which doesn't meet the expected data transmission threshold. Therefore, the processing unit of MSA 102*a* may determine that the data communication performance is not upto the expectation and thus may proceed to perform process 902 for using another SIM profile. There is no limitation on the methods for measuring the speed of data transmission at the cellular router. In one variant, the speed of data transmission may be measured by a measurement application composed in cellular router 100*a*. In another variant, the speed of data transmission may be measured by sending test packets, such as Internet Control Message Protocol (ICMP) packets, by cellular router 100*a*.

Even FIG. 3A, FIG. 3B, FIG. 3C and FIG. 3D disclose the block diagram for different embodiments of the cellular router, the figure may not show the connection between the processing unit of the cellular router and other components in detail. In order to illustrate how half-duplex communication is being performed in the cellular router, the connection between the processing unit of the cellular router and other components are described in FIG. 4A-4C in detail.

In view of FIG. 4A, processing unit 402 is capable of configuring the data flow of the I/O pin of the CPLD 404, including the first I/O pin of CPLD 404 and the second I/O pin of CPLD 404. The configuration is illustrated in FIG. 11.

FIG. 11 is a process flow diagram illustrating half-duplex communication according to the embodiments of the present invention. FIG. 11 should be viewed in conjunction with FIG. 4A. The process is performed by processing unit 402 in the cellular router.

In process 1101, processing unit 402 receives a first message that originated from one of the plurality of WCM, such as WCM 401*a*.

In process 1102, processing unit 402 may select the first UICC connected to the first SIM interface. The first UICC is selected according to the first message originated from the first WCM. For example, UICC 403*a* is selected since the IMSI of UICC 403*a* matches the message originated from WCM 401*a*.

In one variant, eUICC is used instead of UICC. If an eUICC is used, then the eUICC may be directly connected to the CPLD without the use of one or more SIM interfaces. For some eUICC implementations, an eUICC may still connect to a SIM interface and the SIM interface connects to the CPLD.

In one variant, processing unit 402 may also set the direction of the second I/O pin of CPLD.

In process 1103, processing unit 402 may configure the first I/O pin of CPLD to output. In one example, the first I/O pin of CPLD is configured as an output pin if receiving a byte from processing unit 402. In another example, the first I/O pin of CPLD is configured as an output pin if receiving a signal from processing unit 402.

In process 1104, processing unit 402 may send a second message to a first UICC through the first SIM interface. The second message may be the same or different from the first message. For example, the IMSI for responding to the first message is cached in the storage unit. Processing unit 402 may send the second message to a first UICC through the first SIM interface, and the request for IMSI information is not included in the second message. Therefore, the second message is different from the first message.

In process 1105, processing unit 402 may configure the first I/O pin of CPLD to input.

In process 1106, processing unit 402 may receive a third message from the first UICC through the first SIM interface.

In process 1107, processing unit 402 may send a fourth message to the first WCM. The fourth message may be the same or different from the third message.

In one variant, processing unit 402 may not send the fourth message to the first WCM. For example, if the first message is already responded to by using cached information, then processing unit 402 may not respond to the first message using the third message or the fourth message.

In one embodiment, processing unit 402 may receive a reset message originating from the first WCM if the first condition is satisfied. For example, the first condition is satisfied if the first WCM does not receive any response within a period of time. Processing unit 402 may send a reset signal to the first UICC or eUICC to reset the first UICC or eUICC if the reset message originating from the first WCM is received. There is no limitation that the first condition is related to time. The first condition may be selected from the group of the following: status of a UICC or an eUICC and geographic location information of the cellular router.

The invention claimed is:

1. A method for maintaining data communication at a massive SIM apparatus (MSA), comprising;
    (a) receiving a first request from a cellular router;
    (b) selecting a first subscriber identification module (SIM) from a plurality of SIMs based on at least one selection criteria;
    (c) sending SIM profile information of the first SIM to the cellular router; and
    (d) when receiving a second request:
        (i) selecting a second SIM from the plurality of SIMs based on the at least one selection criteria;
        (ii) sending SIM profile information of the second SIM to the cellular router.

2. The method of claim 1, further comprising:
    (e) sending a performance report request from the cellular router; and
    (f) receiving a performance report at the cellular router.

3. The method of claim 2, wherein step (e) and step (f) are performed when performance of a first data connection does not match an expected performance threshold.

4. The method of claim 1, wherein the second request is received from the cellular router when performance of a first data connection does not match an expected performance threshold.

5. The method of claim 4, wherein the expected performance threshold is based on the speed of data transmission.

6. The method of claim 3, wherein the performance is determined by the performance report.

7. The method of claim 1, wherein the cellular router establishes a first wireless carrier connection through a wireless communication module (WCM) according to the SIM profile information of the first SIM.

8. The method of claim 1, wherein the cellular router establishes a second wireless carrier connection through a WCM according to the SIM profile information of the second SIM.

9. The method of claim 1, wherein the at least one selection criteria is selected from one or more of the following: SIM profile category, supported frequency band, supported frequency bands, tariff price, network's performance history of a SIM profile, services, the service quality, administrator's preference, geolocation, billing cycle information, the position of a SIM profile and time.

10. A method for maintaining data communication at a massive SIM apparatus (MSA), comprising;
   (a) receiving a first request from a cellular router;
   (b) selecting a first subscriber identification module (SIM) from a plurality of SIMs based on at least one selection criteria;
   (c) sending SIM profile information of the first SIM to the cellular router; and
   (d) when receiving a second request:
      (i) selecting a second SIM from the plurality of SIMs based on the at least one selection criteria;
      (ii) sending SIM profile information of the second SIM to the cellular router;
   (e) sending a performance report request from the cellular router; and
   (f) receiving a performance report at the cellular router.

11. The method of claim 10, wherein the second request is received from the cellular router when performance of a first data connection does not match an expected performance threshold.

12. An apparatus, comprising:
   at least one processing unit;
   at least one non-transitory computer-readable storage medium;
   at least one storage unit;
   a plurality of network interfaces;
   at least one non-transitory computer-readable storage medium storing program instructions executable by the at least one processing unit for:
      a. receiving a first request from a cellular router;
      b. selecting a first subscriber identification module (SIM) from a plurality of SIMs based on at least one selection criteria;
      c. sending SIM profile information of the first SIM to the cellular router; and
      d. when receiving a second request:
         i. selecting a second SIM from the plurality of SIMs based on the at least one selection criteria;
         ii. sending SIM profile information of the second SIM to the cellular router.

13. The apparatus of claim 12, wherein the at least one non-transitory computer-readable storage medium further storing program instructions executable by the at least one processing unit for:
   (e) sending a performance report request from the cellular router; and
   (f) receiving a performance report at the cellular router.

14. The apparatus of claim 13, wherein step (e) and step (f) are performed when performance of a first data connection does not match an expected performance threshold.

15. The apparatus of claim 12, wherein the second request is received from the cellular router when performance of a first data connection does not match an expected performance threshold.

16. The apparatus of claim 15, wherein the expected performance threshold is based on the speed of data transmission.

17. The apparatus of claim 14, wherein the performance is determined by the performance report.

18. The apparatus of claim 12, wherein the cellular router establishes a first wireless carrier connection through a wireless communication module (WCM) according to the SIM profile information of the first SIM.

19. The apparatus of claim 12, wherein the cellular router establishes a second wireless carrier connection through a WCM according to the SIM profile information of the second SIM.

20. The apparatus of claim 12, wherein the at least one selection criteria is selected from one or more of the following: SIM profile category, supported frequency band, supported frequency bands, tariff price, network's performance history of a SIM profile, services, the service quality, administrator's preference, geolocation, billing cycle information, the position of a SIM profile and time.

* * * * *